United States Patent
Inakoshi

(10) Patent No.: US 8,539,010 B2
(45) Date of Patent: Sep. 17, 2013

(54) VIRTUAL MACHINE, VIRTUAL MACHINE MONITOR AND COMPUTER CONTROL METHOD

(75) Inventor: Hiroya Inakoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 12/983,972

(22) Filed: Jan. 4, 2011

(65) Prior Publication Data

US 2011/0179417 A1 Jul. 21, 2011

(30) Foreign Application Priority Data

Jan. 15, 2010 (JP) ................. 2010-007426

(51) Int. Cl.
*G06F 9/455* (2006.01)
*G06J 1/00* (2006.01)
(52) U.S. Cl.
CPC .................... *G06J 1/00* (2013.01)
USPC .............................. 708/1; 703/23
(58) Field of Classification Search
None
See application file for complete search history.

(56) References Cited

U.S. PATENT DOCUMENTS

| | | | | |
|---|---|---|---|---|
| 7,475,002 | B1* | 1/2009 | Mann | 703/23 |
| 2008/0104591 | A1* | 5/2008 | McCrory et al. | 718/1 |
| 2008/0222632 | A1 | 9/2008 | Ueno et al. | |
| 2008/0271019 | A1* | 10/2008 | Stratton et al. | 718/1 |
| 2009/0241112 | A1* | 9/2009 | Shimogawa | 718/1 |
| 2010/0223611 | A1* | 9/2010 | Mahalingam et al. | 718/1 |
| 2010/0274940 | A1* | 10/2010 | Ahmad et al. | 710/267 |
| 2011/0088030 | A1* | 4/2011 | Agesen et al. | 718/1 |

FOREIGN PATENT DOCUMENTS

| | | |
|---|---|---|
| JP | 2006-059052 A | 3/2006 |
| JP | 2008-225655 A | 9/2008 |

OTHER PUBLICATIONS

Sugerman, J. et al., "Virtualizing I/O Devices on VMware Workstation's Hosted Virtual Machine Monitor," Usenix Annual Technical Conference (ATC), Usenix Association, Berkeley, CA, Jun. 25, 2000, pp. 1-14, XP002608919.
Zheng, H. et al., "WARP: Enabling Fast CPU Scheduler Development and Evaluation," Performance Analysis of Systems and Software, ISPASS, IEEE, Piscataway, NJ, Apr. 26, 2009, pp. 101-112, XP031455766.
Extended European Search Report dated Dec. 18, 2012 for corresponding European Application No. 11150743.0.

* cited by examiner

*Primary Examiner* — Emerson Puente
*Assistant Examiner* — Mehran Kamran
(74) *Attorney, Agent, or Firm* — Fujitsu Patent Center

(57) ABSTRACT

A virtual machine monitor for a virtual machine. The virtual machine monitor makes the processor in the virtual machine: receive a timer setting from the guest OS in place of the timer, the timer setting being for making the timer generate a timer interrupt after a lapse of a setting period; change, when the guest OS inputs or outputs data from or to the I/O device via the virtual machine monitor, the setting period set in the timer so that a relation between I/O wait time recognized by the guest OS and I/O process time other than the I/O wait time becomes approximate to a relation between the I/O wait time recognized by the virtual machine monitor and the I/O process time; set the timer setting with the changed setting period in the timer; and notify, when receiving the timer interrupt, the guest OS of occurrence of the timer interrupt.

9 Claims, 14 Drawing Sheets

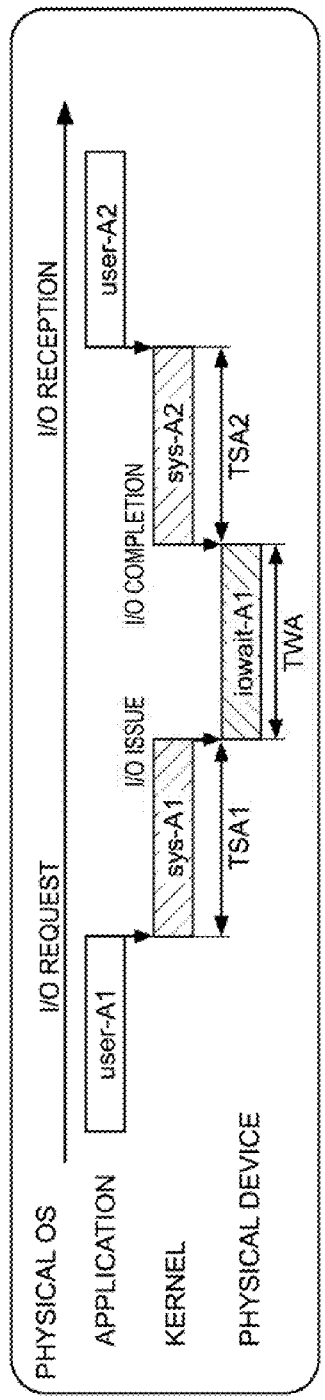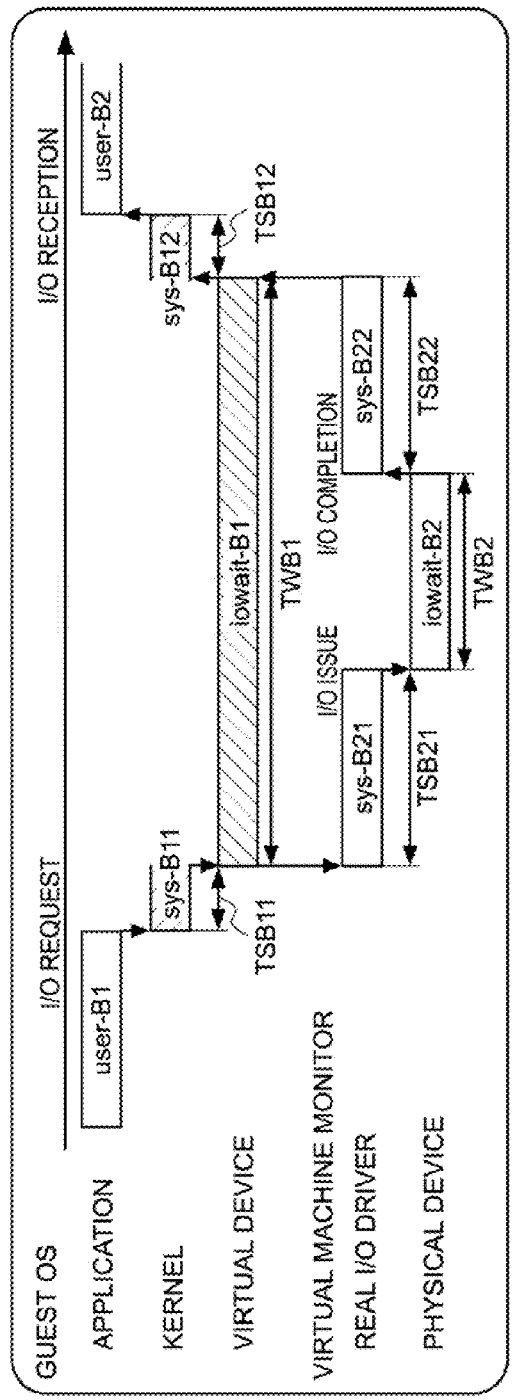
FIG. 4A
FIG. 4B

FIG. 8

| NAME | EXAMPLE OR DOMAIN | DESCRIPTION |
|---|---|---|
| EXECUTION CONTEXT | ax=0x0001,a8f4, bx=0xff00,001f, ⋮ ip=0cfc80,0020 | REGISTER VALUE OR OTHER DATA REPRESENTING STATUS OF VM REQUIRED FOR VIRTUALIZATION |
| EXIT FLAG | 0 OR 1 | VALUE IS SET TO 1 WHEN VM EXECUTES PRIVILEGE INSTRUCTION OR THE LIKE AND PROCESS IS HANDED OVER TO HYPERVISOR. VALUE IS SET TO 0 WHEN PROCESS IS RETURNED TO VM FROM HYPERVISOR. |
| WAIT-FOR-COMPLETION I/O COUNT | INTEGER | NOT-YET-COMPLETED I/O COUNT IN I/O REQUESTS ISSUED BY VM |

FIG. 9

| NAME | DOMAIN | DESCRIPTION |
|---|---|---|
| USER TIME | INTEGER (UNIT: CPU CYCLE) | TOTAL OF APPLICATION EXECUTION TIME |
| SYS TIME | SAME AS ABOVE | TOTAL OF KERNEL PROGRAM EXECUTION TIME |
| IOWAIT TIME | SAME AS ABOVE | TOTAL OF TIME WHEN EXECUTING NEITHER APPLICATION PROGRAM NOR KERNEL PROGRAM AS WELL AS BEING STANDBY TIME TILL PROCESS OF DEVICE IS COMPLETED |
| IDLE TIME | SAME AS ABOVE | TOTAL OF TIME WHEN EXECUTING NEITHER APPLICATION PROGRAM NOR KERNEL PROGRAM AS WELL AS BEING NOT-STANDBY TIME TILL PROCESS OF DEVICE IS COMPLETED |

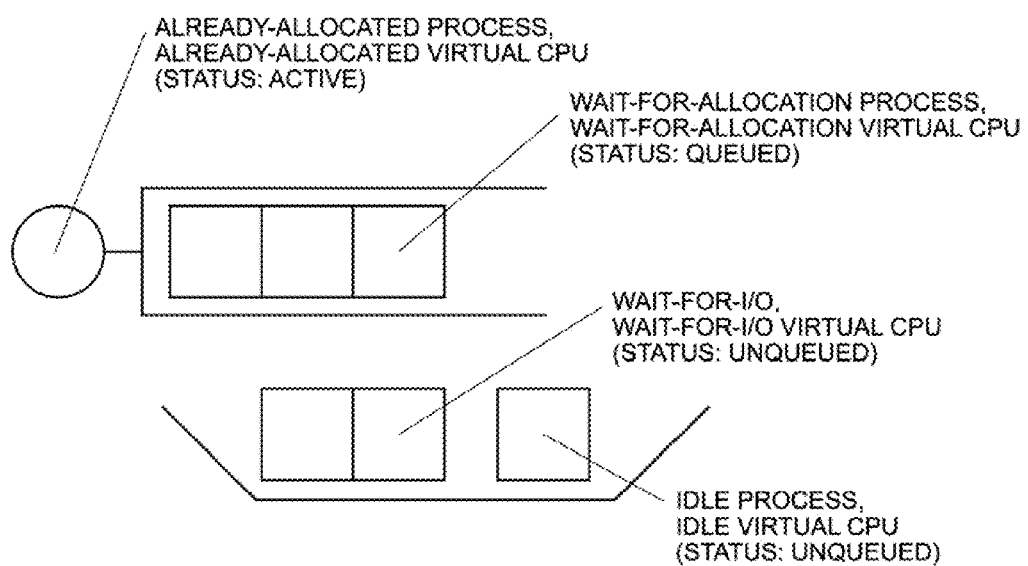

VIRTUAL MACHINE, VIRTUAL MACHINE MONITOR AND COMPUTER CONTROL METHOD

CROSS-REFERENCE TO RELATED APPLICATIONS

This application is based upon and claims the benefit of priority of the prior Japanese Patent Application No. 2010-007426, filed on Jan. 15, 2010, the entire contents of which are incorporated herein by reference.

FIELD

The present invention relates to a technology of managing execution time of a process on a virtual machine.

BACKGROUND

FIG. 1 illustrates an example of a configuration of a computer system called a virtual machine. Known as one example of the virtual machine is a system in which hardware such as a CPU (Central Processing Unit) and a memory is installed with a computer program called a virtual machine monitor. In the virtual machine, one guest OS or a plurality of guest OSs runs on the virtual machine monitor. Further, an application program runs on the guest OS. The virtual machine is also called a virtual computer, a VM (Virtual Machine), etc.

The virtual machine monitor is a computer program that is also called a VMM (Virtual Machine Monitor) and Hypervisor. The virtual machine monitor controls the whole virtual machine. For example, the virtual machine monitor executes, when the plurality of guest OSs operates, a dispatch process of the guest OS, i.e., a process of determining the guest OS to which the CPU is allocated and starting up the guest OS. Further, the virtual machine monitor performs emulation of a privilege instruction executed by each guest OS. For instance, when the guest OS makes a request for executing the privilege instruction in a user status, the virtual machine monitor executes a process of intercepting the privilege instruction requested for the execution by exception handling and emulating the execution-requested privilege instruction.

Moreover, the virtual machine monitor is started up when the virtual machine is booted, and the virtual machine monitor performs the processes such as starting up and stopping the guest OS and managing and controlling the virtual machine. There is, however, a case in which the virtual machine is managed and controlled via a special guest OS called a host OS. Further, there is a case in which the management and the control of the virtual machine are performed as a function called service control by a computer program different from the virtual machine monitor.

Still further, the virtual machine monitor performs an I/O (input/output) process with a physical device in response to an I/O request given from the guest OS. The I/O process with the physical device is also called a real I/O process. For example, each guest OS requests, through an interface called a Hypervisor call, the virtual machine monitor to execute the I/O process. Then, the virtual machine monitor accesses, via a device driver, the physical device such as a display, an external storage device and a LAN (Local Area Network). Known also is, however, a configuration in which the guest OS called a driver OS (driver domain) dedicated to the execution of the real I/O process or the host OS described above executes the real I/O process.

On the other hand, the guest OS can be exemplified as the OS having no real I/O on the virtual machine. The guest OS provides the application program with virtual resources on the hardware via the virtual machine monitor. Accordingly, in terms of a relation with the application program, the guest OS can be considered to be the normal OS. It should be noted that the guest OS, the host OS and the driver OS on the virtual machine monitor are deemed to be different computers and are therefore each called the virtual machine as the case may be.

In the virtual machine, the application program is executed on the guest OS, while the guest OS is executed on the virtual machine monitor. And, when the application program requests the guest OS to execute the I/O process, the guest OS issues an I/O instruction. The thus-issued I/O instruction is, e.g., intercepted by the virtual machine monitor, and the I/O process with the physical device is performed by the driver of the virtual machine monitor, the guest OS or the host OS. The guest OS, however, hands over the I/O instruction to the virtual machine monitor by issuing the Hypervisor call as the case may be. In any case, the operation of the virtual machine, which ranges from the request for the I/O process of the application program to the I/O process with the physical device, is complicated.

As described above, the virtual machine has a complicated path extending from the I/O process request to the I/O to the actual physical device, and besides the guest OS receives the virtual interrupt via the virtual machine monitor and measures the time. Accordingly, such a problem arises that in the virtual machine, the guest OS is disabled from acquiring performance information such as execution time of the process which involves the I/O process with high accuracy.

[Documents of Related Arts]
 [Patent document 1] Japanese Laid-Open Patent Publication No. 2008-225655
 [Patent document 2] Japanese Laid-Open Patent Publication No. 2006-059052

SUMMARY

One aspect of the disclosed technology can be exemplified as a virtual machine having a computer including a memory, a processor, a timer and an I/O device and a virtual machine monitor deployed on the memory and executed by the processor. The virtual machine monitor controls execution of at least one guest OS (Operating System) on the processor, accepts a process request given to the computer from the guest OS, and hands over an execution result of the computer in response to the process request to the guest OS. For example, the virtual machine monitor may simply make the processor function as a unit to receive, in place of the timer, a timer setting for setting occurrence (generation) of a timer interrupt after a lapse of a setting period in the timer from the guest OS. Further, the virtual machine monitor may also simply make the processor as a timer changing unit. Herein, the timer changing unit changes the timer setting when the guest OS inputs and outputs data to the I/O device via the virtual machine monitor. For instance, the timer changing unit changes the timer setting so that a ratio of I/O wait time recognized by the guest OS to I/O process time other than the I/O wait time becomes approximate to a ratio of the I/O wait time recognized by the virtual machine monitor to the I/O process time. Still further, the virtual machine monitor, when receiving the timer interrupt, may simply make the processor function as a unit to notify the guest OS of the occurrence of the timer interrupt.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 4A is a diagram illustrating an example of process time on a per-status basis on a physical computer;

FIG. 4B is a diagram illustrating an example of the process time on the per-status basis on a virtual machine;

FIG. 8 is a diagram illustrating an example of virtual CPU management data;

FIG. 9 is a diagram illustrating a type of time measured by the virtual machine;

FIG. 10 is a diagram illustrating a process of a process scheduler in a physical OS;

FIG. 11 is a diagram illustrating a virtual CPU status table;

DESCRIPTION OF EMBODIMENT(S)

A computer system according to one embodiment will hereinafter be described with reference to the drawings. A configuration in the following embodiment is an exemplification, and the computer system is not limited to the configuration in the embodiment.

Figure 1:
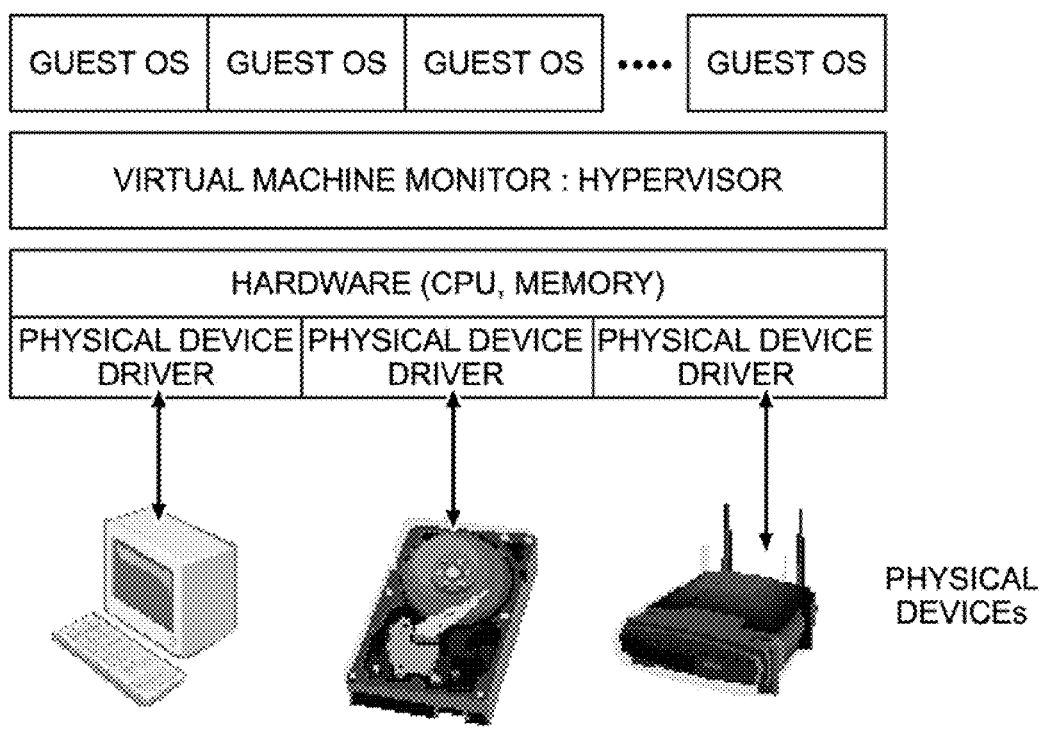
FIG. 1 is a diagram illustrating an example of a configuration of a computer system.
Figure 2:
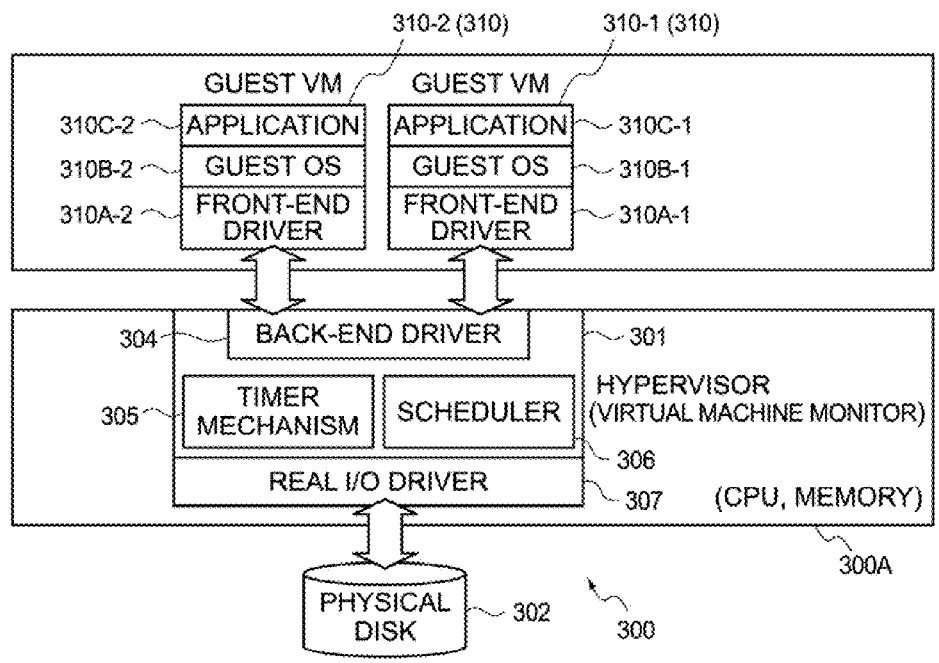
FIG. 2 is a diagram illustrating a configuration of the computer system according to a comparative example.

A computer system 300 according to a comparative example will hereinafter be described with reference to FIGS. 2 through 4. FIG. 2 illustrates a configuration of the computer system 300 according to the comparative example. As in FIG. 2, the computer system 300 includes, as pieces of hardware, e.g., a processing device 300A including a CPU (Central Processing Unit) and a memory, and a physical disk 302. The CPU corresponds to a processor. On the processing device 300A, a virtual machine monitor 301 operates to manage and control the computer system 300.

Further, a guest virtual machine 310-1 including a front-end driver 310A-1, a guest OS 310B-1 and an application program 310C-1 operates on the virtual machine monitor 301. Moreover, a guest virtual machine 310-2 including a front-end driver 310A-2, a guest OS 310B-2 and an application program 310C-2 operates on the virtual machine monitor 301. Hereinafter, the guest virtual machines 310-1, 310-2 are, as generically termed, the guest virtual machine 310. Furthermore, the front-end drivers 310A-1, 310A-2, the guest OSs 310B-1, 310B-2 and the application programs 310C-1, 310C-2 are, as generically termed, called the front-end driver 310A, the guest OS 310B and the application program 310C, respectively.

As in FIG. 2, the virtual machine monitor 301 includes a back-end driver 304, a timer mechanism 305, a scheduler 306 and a real I/O driver 307. The back-end driver 304 functions as an interface with the front-end driver 310A connected to the guest OS 310B. For example, the back-end driver 304 shares an unillustrated shared memory with the front-end driver 310A, thus transferring and receiving the data therebetween.

On the computer system 300, the virtual machine monitor 301 schedules the processes of the guest virtual machine 310. To be specific, the virtual machine monitor 301, after saving register value of the guest virtual machine 310 into a predetermined memory area, switches over the virtual machine 310 to which the CPU is allocated. When switching over the guest virtual machine, for instance, the CPU is released from the guest virtual machine 310-1, and, instead, the CPU is allocated to the guest virtual machine 310-2. More specifically, the CPU is released from the guest OS 310B-1 and the CPU is allocated to the guest virtual machine 310B-2. Allocation of the CPU to the guest OS 310B is performed by the scheduler 306. Note that the scheduler 306 is also called a virtual CPU scheduler. Further, a computer program execution environment as viewed from the guest OS 310B, for instance, a resource containing a register set is called a virtual CPU.

The scheduler 306 executes a dispatch process of allocating the CPU to the guest OS 310B. For example, the scheduler 306 sequentially starts up the guest OSs 310B-1 and 310B-2 on a time-sharing basis. Moreover, the scheduler 306, when the guest OS 310B-1 is now being started up, saves the present register set into the predetermined memory area. Then, the scheduler 306 stops the guest OS 310B-1. Furthermore, the scheduler 306 takes over the saving content of the register set of the guest OS 310B-2, of which the process is now being interrupted, to the guest OS 310B-2. Then, the scheduler 306 starts up the guest OS 310B-2.

The timer mechanism 305 sets an address of an interrupt processing program in an interrupt vector of the built-in CPU of the processing device 300A, and sets the timer interrupt in the register by specifying a predetermined time. Then, the timer interrupt occurs in the CPU after an elapse of the predetermined time, the CPU starts up a process of the interrupt processing program set in the predetermined address on a memory space, which corresponds to the occurred timer interrupt. The virtual machine monitor 301 recognizes the elapse of the predetermined time from the process of the interrupt processing program. The virtual machine monitor 301 measures the time by repeatedly receiving the timer interrupt on the basis of the interrupt processing program. Note that the interrupt processing program is also called a handler and a callback function as well.

An I/O instruction to the physical device such as the physical disk 302 is, e.g., processed as follows. The application program 310C running on the guest OS 310B invokes the I/O instruction of the guest OS 310B by use of a system call. Then, the guest OS 310B sets an I/O request in the shared memory via the front-end driver 310A, and requests the virtual machine monitor 301 to execute the process through a function called a Hypervisor call. Thereupon, the back-end driver 304 reads the I/O request set in the shared memory and hands over this request to the virtual machine monitor 301. The virtual machine monitor 301, according to the thus handed-over I/O request, starts up the device driver which accesses the physical device and executes the I/O process.

In the I/O process, the device driver executes a data transfer instruction, whereby the data in a buffer area reserved in the predetermined memory area is handed over to an unillustrated I/O controller. The data to be handed over contains a command given to the I/O controller and the I/O data that is input or output. After issuing the data transfer instruction, the scheduler 306 makes the guest virtual machine 310 go to an I/O waiting status. As a result, the operation of the guest virtual machine 310 the status of which is changed to the I/O waiting status is temporarily interrupted. Then, the scheduler 306, while the operation of the guest virtual machine 310 in the I/O waiting status remains interrupted, allocates the CPU, which has so far been allocated to the guest virtual machine with its operation kept interrupting, to another guest virtual machine 310. Note that the I/O controller notifies the CPU through the interrupt that the I/O process of the physical device is completed.

The guest OS 310B requests the virtual machine monitor 301 to execute the I/O process through the Hypervisor call, however, the following procedures can be also used instead. For example, when the guest OS 310B invokes the system call of the I/O request in a user status, the CPU detects a privilege instruction violation. Next, the CPU transfers the control to the virtual machine monitor 301, and the virtual machine monitor 301 may emulate the I/O process from the system call.

The virtual machine monitor 301 starts up a plurality of guest virtual machine 310-1, 310-2, e.g., on the time-sharing basis. It should be noted that the driver OS and the host OS may be loaded with the back-end driver and may execute the real I/O control. The guest virtual machine 310 will hereinafter be also simply termed the virtual machine 310.

Figure 3:
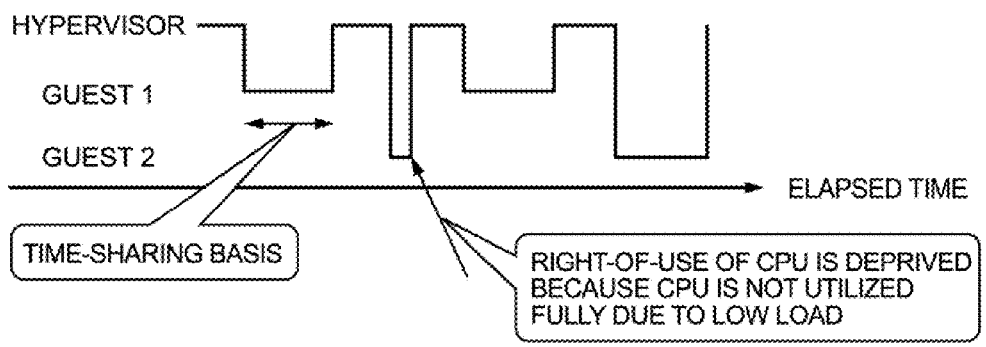
FIG. 3 is a diagram illustrating a schedule example of a guest OS according to a comparative example.

FIG. 3 illustrates a scheduling example of the guest OS 310B in the computer system 300. In FIG. 3, a guest 1 represents the guest OS 310B-1, and a guest 2 represents the guest OS 310B-2. In the computer system 300, the CPU of the processing device 300A is allocated to the guest 1 and the guest 2 alternately, e.g., on the time-sharing basis, thereby operating the plurality of guest OSs 310B. A period of allocation time per allocation, which is time-shared, can be defined fixedly within the virtual machine monitor 301. Further, the allocation time can be set based on a system parameter etc.

Moreover, if the guest OS 310B is unable to completely consume the given time for the reason such as a low load of the guest OS 310B, the scheduler 306 deprives the guest OS with the low load, e.g., the guest OS 310B-1 of a right-of-use of the CPU but allocates the CPU to another guest OS, e.g., the guest OS 310B-2, thus operating the guest OS 310B-2. The CPU resources can be effectively utilized owing to the management of the CPU allocation to the guest OS 310B as in FIG. 3.

The guest OS 310B continues to collect various items of statistical information by use of the timer mechanism via the virtual machine monitor 301. The statistical information contains, for instance, user time which indicates a period of time when each process running on the guest OS 310B operates in the user status, system time (sys time) indicating a period of time of operating in a kernel status on the extension of this process, I/O waiting time (iowait time) indicating a period of time required for the I/O wait, and so on. The statistical information is useful for performance tuning etc. of the application program and middleware.

In the computer system 300 including the virtual machines, the virtual machine monitor 301 processes the I/O request of the guest OS 310B in a way that converts the I/O request into the real I/O process with respect to the physical device by use of the back-end driver 304 and the front-end driver 310A. In the computer system 300 or by using the emulation of the I/O instruction by the virtual machine monitor 301, the virtual machine monitor 301 processes the I/O request of the guest OS 310B in a way that converts the I/O request into the real I/O process with respect to the physical device.

Figure 4C:
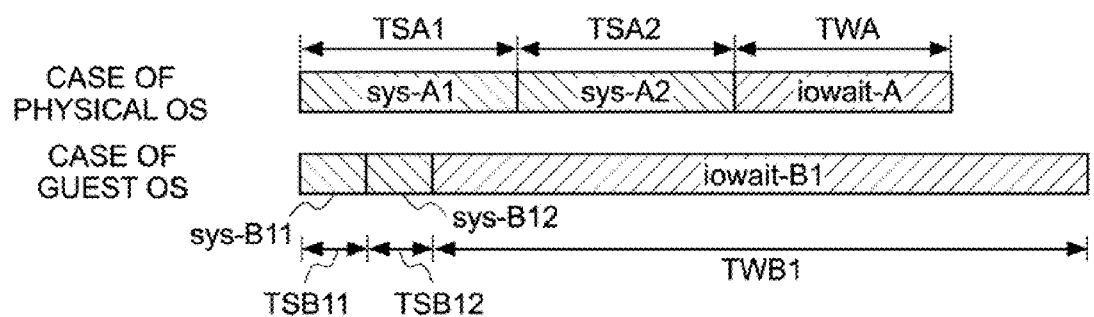
FIG. 4C is a diagram illustrating time ratios on the per-status basis between the physical computer and the virtual machine.

FIGS. 4A-4C illustrate the I/O process in the computer system 300 including the virtual machine 310 in comparison with a normal computer including none of the virtual machine. The normal computer, which does not include the virtual machine, will hereinafter be called a physical computer. The physical computer includes a physical CPU. Further, the OS running on the physical computer is called a physical OS.

FIG. 4A illustrates an example of the time recognized by the physical OS in the I/O process of the physical computer. In FIG. 4A, an "APPLICATION" line indicates that the physical CPU executes the application program. The application program will hereinafter be simply termed the application. During the execution of the application, the process executed by the physical CPU is in the user status. Furthermore, in FIG. 4A, a "KERNEL" line indicates that the process executed by the physical CPU is in the kernel status. The user status and the kernel status will be described in a first working example which will be discussed later on. Further, in FIG. 4A, a "PHYSICAL DEVICE" line indicates the process of the physical device.

In the example of FIG. 4A, during the execution of the application, i.e., during the process by the physical CPU is in the user status (user-A1), the I/O request occurs for the application and a process in the kernel status (sys-A1) is performed. Then, in the process in the kernel status (sys-A1), an I/O issue with respect to the physical device is made, and the real I/O process with respect to the physical device is performed. Subsequently, the process in the kernel status comes to the I/O wait (iowait-A). In FIG. 4A, the process in the kernel status (sys-A1) is started in response to the I/O request given from the application, and the process in the kernel status (sys-A1) comes to the I/O wait due to the I/O issue with respect to the physical device. During the I/O wait (iowait-A), the process in the kernel status of the physical OS is deprived of the right-of-use of the CPU. Incidentally, in FIG. 4A, an interval at which the process in the kernel status is the I/O wait is indicated by a blank interval in the line of the kernel corresponding to "iowait-A" in the line of the physical device, however, the blank interval in the line of the kernel corresponding to "iowait-A1" is also referred to as "iowait-A1."

Then, after an I/O completion with respect to the physical device, a process in the kernel status (sys-A2) is performed. Moreover, upon finishing the process in the kernel status (sys-A2), a process in the user status (user-A2) is performed. An assumption in FIG. 4A is that periods of time of the process in the kernel status (sys-A1), the I/O wait (iowait-A)

with respect to the physical device and the process in the kernel status (sys-A2) are TSA1, TWA and TSA2, respectively.

FIG. 4B illustrates an example of the time recognized by the guest OS 310B in the I/O process of the virtual machine monitor 301 and the time recognized by the virtual machine monitor 301. In the example of FIG. 4B, in the virtual machine monitor 301, the application is executed in the user status on the guest OS 310B. During the execution of the application in the user status (user-B1), the I/O request occurs from the application, and a process in the kernel status (sys-B11) of the guest OS 310B is carried out. The process in the kernel status (sys-B11) includes, e.g., the process of the front-end driver 310A.

Then, in the process in the kernel status (sys-B11), the request for the I/O process with the virtual device is made. The I/O process with the virtual device is converted into the process by the real I/O driver of the physical device on the virtual machine monitor 301, and a process by the real I/O driver (sys-B21) is performed. Then, the I/O issue is done for the physical device in the process by the real I/O driver (sys-B21), and the process by the real I/O driver (sys-B21) comes to the I/O wait (iowait-B2) with respect to the physical device. In FIG. 4B, the process in the kernel status (sys-A1) of the guest OS 310B is started in response to the I/O request given from the application. Then, in the process of the real I/O driver (sys-B21), into which the I/O process with the virtual device is converted, the I/O issue is done for the physical device. In the case of FIG. 4B, the process in the kernel status of the guest OS 310B extends from the I/O request given from the application to the request for the I/O process with the virtual device, and it corresponds to the process in the kernel status in the case of the physical OS in FIG. 4A. Accordingly, the process of the sys-A1 in FIG. 4A is hatched in the same way as the process of sys-B11 is hatched.

Then, upon the completion of the I/O process with the physical device, the control returns to the process by the real I/O driver (sys-B22). Further, with the termination of the process by the real I/O driver (sys-B22), the process in the kernel status (sys-B12) of the guest OS 310B is performed. The process of sys-B12 contains, similarly to the process of sys-B11, the process by the front-end driver 310A.

Then, further, with the termination of the process in the kernel status (sys-B12) of the guest OS 310B, the control gets back to the process of the application in the user status (user-B2). The process in the kernel status (sys-B12) of the guest OS 310B in FIG. 4B corresponds to the process in the kernel status (sys-A2) in FIG. 4A. Therefore, the process of the sys-A2 in FIG. 4A is hatched in the same way as the process of sys-B12 is hatched.

Then, as in FIG. 4B, the guest OS 310B recognizes, in the process taking the kernel status (sys-B11), a period of time till a virtual I/O process (iowait-B1) with the virtual device is finished since this process has been started up, as the time of the I/O wait (iowait time) with respect to the virtual device.

An assumption in FIG. 4B is that periods of processing time of the process in the kernel status (sys-B11) of the guest OS 310B, the I/O wait (iowait-B1) with respect to the virtual device and the process in the kernel status (sys-B12) are TSB11, TWB1 and TSB12, respectively.

Further, it is also assumed in FIG. 4B that periods of the time of the process of the real I/O driver (sys-B21), the time of the I/O wait (iowait-B2) of the physical device and the processing time of the process of the real I/O driver (sys-B22) in the virtual machine monitor 301 are TSB21, TWB2 and TSB22, respectively.

As described above, the process in the kernel status (sys-B11) of the guest OS 310B is kept in the I/O waiting status during the execution of the process (iowait-B1) for the virtual device. The process in the kernel status (sys-B11) of the guest OS 310B is kept to be the I/O wait, during which (the interval at which the virtual device is in iowait-B1) the guest OS 310B is deprived of the right-of-use of the CPU on the basis of the scheduling by the scheduler 306.

Herein, in the processing time of the guest OS 310B, a period of time till the process in the kernel status is deprived of the right-of-use of the CPU (the time of TSB11 based on the process of sys-B11), is calculated as the system time (sys time) of the guest OS 310. Note that a period of time after the I/O wait (the interval at which the virtual device is in iowait-B1) till the status of the guest OS 310B returns to the user status from the kernel status (the time of TSB12 based on the process of sys-B12) is also calculated as the system time (sys time) of the guest OS 310.

On the other hand, during the process in the kernel status (sys-B11) of the guest OS 310B is kept to be the I/O wait (iowait-B1) with respect to the virtual device, in the virtual machine monitor 301, the process by the real I/O driver (sys-B21) is performed and the I/O issue is done to the physical device from the process of the real I/O driver (sys-B21). Then, after the I/O issue to the physical device, the process of the real I/O driver (sys-B21) comes to the I/O wait.

However, as for the statistical information of the guest OS 310B, the period of time (TSB21 and TSB22) while the real I/O driver of the virtual machine monitor 301 performs the processes (sys-B21 and sys-B22) is calculated as the I/O wait time (iowait time). Namely, in the guest OS 310B, the time TWB1 of the I/O wait (iowait-B1) with the virtual device turns out to be a period of time obtained by adding the time TSB21 and time TSB22 of the processes (sys-B21 and sys-B22) of the real I/O driver before and after the I/O wait in addition to the time TWB2 of the I/O wait (iowait-B2) with the physical device.

A comparison between the processing time as viewed from the physical OS in the case of FIG. 4A and the processing time as viewed from the virtual OS 310B in FIG. 4B, is made as follows. In the physical OS, the processing time after the I/O request has been given from the application includes the time TSA1 of the process (sys-A1) till the I/O issue in the kernel status is done in the physical OS, the wait time (the time corresponding to the interval of iowait-A1) TWA till the I/O completion is made since the I/O issue has been done and the time TSA2 of the process (sys-A2) till I/O reception is made since the I/O completion has been performed.

On the other hand, in the case of the virtual machine system 300 in FIG. 4B, the time TSB21 of the process (sys-B21) by the real I/O driver corresponds to the time TSA1 in FIG. 4A. Similarly, the time TSB22 in FIG. 4B corresponds to the time TSA2 in FIG. 4A. Then, the time TWB2 of the I/O wait (iowait-B2) with the physical device corresponds to the time TWA in FIG. 4A. Accordingly, a relation between the time TSB21+TSB22 of the processes (sys-B21,sys-B22) of the real I/O driver in the virtual machine monitor 301 and the time TWB2 of the I/O wait (iowait-B2) with the physical device, substantially corresponds to the case of the physical OS. To be specific, the relation between the time TSA1+TSA2 of the processes (sys-A1, sys-A2) in the kernel status in the case of the physical OS and the time TWA of the I/O wait (iowait-A1) with the physical device, corresponds to the relation between the time TSB21+TSB22 and the time TWB2 in the virtual machine monitor 301.

However, the relation between of the time related to the I/O process as viewed from the guest OS 310B in FIG. 4B does not necessarily correspond to the relation of the time related to the I/O process as viewed from the physical OS in FIG. 4A. Namely, as in FIG. 4B, in the guest OS 310B, the time TWB1 of the I/O wait (iowait-B1) with the virtual device includes the time TSB21+TSB22 of the processes (sys-B21,sys-B22) of the real I/O driver and the time TWB2 of the I/O wait (iowait-B2) with the physical device. Hence, the time TWB1 of the I/O wait (iowait-B1) with the virtual device is longer by the time TSB21+TSB22 of the processes (sys-B21,sys-B22) of the real I/O driver than the time TWB2 of the I/O wait (iowait-B2) with the physical device.

As a result, the relation between the time TSB11+TSB12 of the processes (sys-B11, sysB12) in the kernel status as viewed from the guest OS 310B and the time TWB1 of the I/O (iowait-B1) with the virtual device is different from the relation between the time TSA1+TSA2 and the time TWA in the virtual machine monitor 301 corresponding to the physical OS running on the physical computer.

As in FIG. 4B, the I/O wait time TWB1 as viewed from the guest OS 310B is the time including the system time TSB21+TSB22 for which the virtual machine monitor 301 operates in the kernel status and the I/O wait time TWB2 of the virtual machine monitor 301. Accordingly, the I/O wait time TWB1 required for the I/O wait in the virtual machine 310 as viewed from the guest OS 310B is measured as a longer period of time than the I/O wait time TWB2 required for the I/O wait of the real I/O driver executed by the virtual machine monitor.

FIG. 4C illustrates a comparative relation between the processing time in the kernel status and the I/O wait time with respect to the physical OS on the physical computer and the guest OS 310B on the virtual machine 310. As in FIG. 4C, the time TSB11+TSB12 of the processes (sys-B11, sysB12) in the line attached with a character string "CASE OF GUEST OS" is shorter than the time TSA1+TSA2 of the processes (sys-A1,sys-A2) in the line attached with a character string such as "CASE OF PHYSICAL OS." On the other hand, the time TWB1 of iowait-B1 in the line attached with the character string "CASE OF GUEST OS" is longer than the time TWA of iowait-A in the line attached with the character string such as "CASE OF PHYSICAL OS." Therefore, the statistical information of the guest OS 310B decreases in reliability by way of a key to performance tuning.

FIG. 4B illustrates a process in the case of having one guest OS 310B. Plural guest OSs 310B operate, in which case a more complicated situation related to the statistical information occurs. Because of the situation as illustrated in FIGS. 4A-4C, in the case of conducting the performance tuning of the application program 310C on the guest OS 310B or the middleware on the guest OS 310B, the statistical information viewed from the guest OS 310B hard to be reliable. Such being the case, it is also considered that the statistical information collected by the virtual machine monitor 301 is utilized in place of the statistical information viewed from the guest OS 310B. Normally, however, the statistical information of the virtual machine monitor 301 is not disclosed to the users of the guest OS 310B in terms of the security and access authority.

The computer system according to the embodiment is provided with a mechanism for correcting the timer mechanism so that the statistical information collected by the guest OS is equalized to the statistical information viewed from the physical computer without adding any modification to the guest OS. The computer system according to the embodiment guest OS provides the more effective statistical information than by the computer system 300 according to the comparative example in terms of the performance tuning of the application program and the middleware owing to the mechanism for correcting the timer mechanism.

FIRST WORKING EXAMPLE

Figure 5:
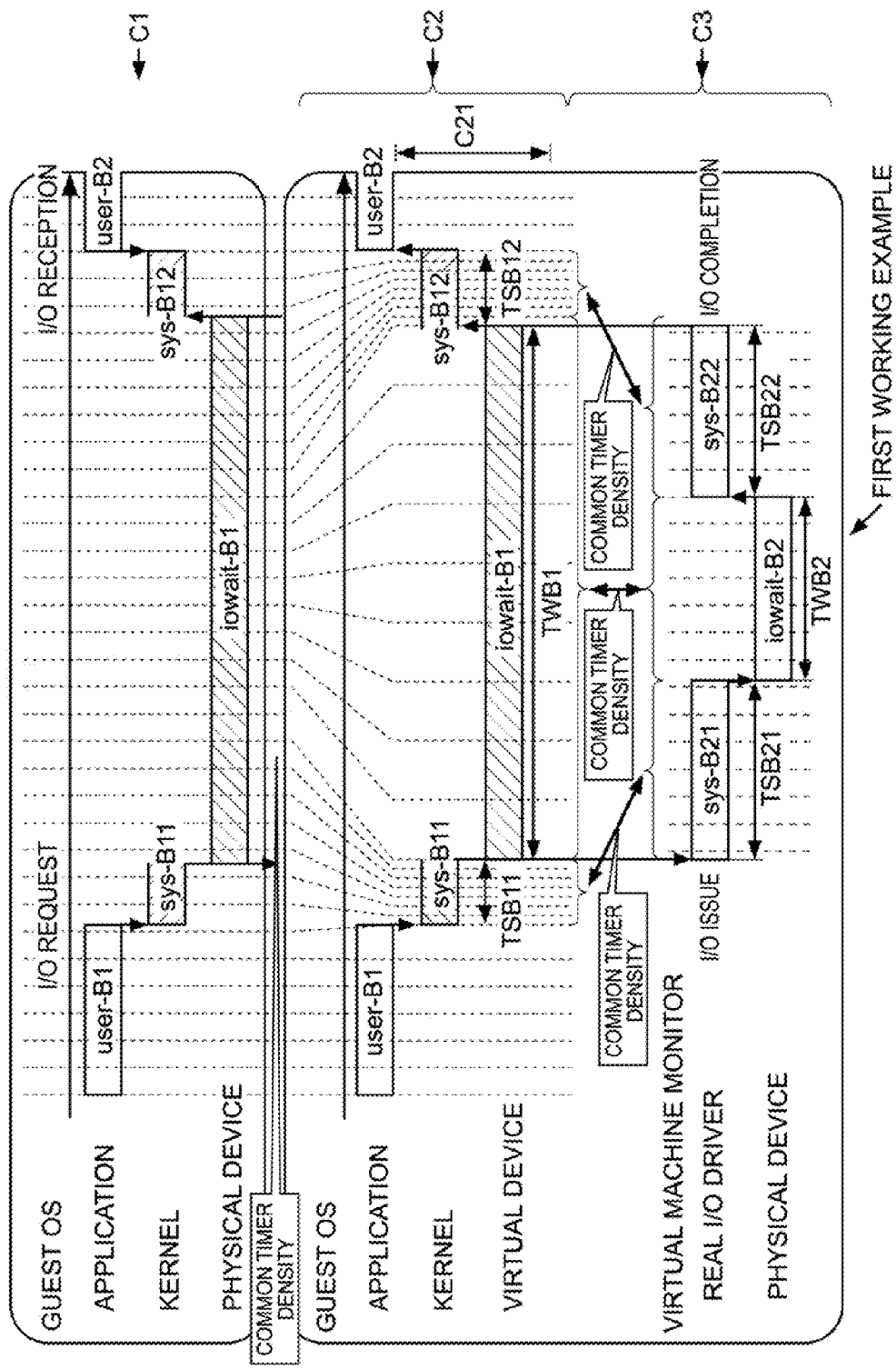
FIG. 5 is a diagram illustrating an example of the process time in an I/O process in the virtual machine according to a first working example in comparison with the virtual machine in the comparative example.

The computer system (which will hereinafter be referred to as a virtual system) according to a first working example will hereinafter be described with reference to FIGS. 5 through 16. FIG. 5 illustrates an example of how the processing time of the I/O process in the virtual system according to the first working example is managed in comparison with the computer system 300 in the comparative example. In FIG. 5, an example of the processing time in the I/O process of the computer system 300 according to the comparative example is given in an upper stage designated by a symbol C1, while an example of the processing time in the I/O process of the virtual system according to the first working example is given in a lower stage designated by symbols C2 and C3. Broken lines extending in the vertical direction in FIG. 5 represent time delimiters detected by the timer. The time delimiters of the timer in the guest OS 310B are identical with the time delimiters of the timer in the virtual machine monitor 301 which manages the guest OS 310B, and hence the time delimiters of the timer in the virtual machine monitor 301 are omitted in C1 of FIG. 5. Further, the processes denoted by user-B1, user-B2, sys-B11, iowait-B1, sys-B12, sys-B21, iowait-B2 and sys-B22 are the same as those in the case of FIG. 4B. In the first working example, however, the virtual machine monitor adjusts the time when the virtual machine monitor notifies the guest OS of the timer interrupt. The time adjustment might lead to occurrence of such a state that a discrepancy occurs between the time delimiters of the timer in the guest OS and the time delimiters of the timer in the virtual machine monitor. Such being the case, in FIG. 5, C2 indicates the time delimiters of the timer in the guest OS according to the first working example, and C3 indicates the time delimiters of the timer in the virtual machine monitor according to the first working example. Herein, the time delimiters of the timer in the guest OS are shown as just the time of the timer interrupt observed by the guest OS. Further, the time delimiters of the timer in the virtual machine monitor are shown as just the time of the timer interrupt observed by the virtual machine monitor.

The time of the timer interrupt observed by the guest OS in the first working example is depicted by the broken line extending in the vertical direction within a range defined by arrows of C21 in the field of the symbol C2. Note that in the field of the symbol C2, the broken line existing more upward than the range defined by the arrows of C21 is a line for reference serving to represent a relation with the timer interrupt time in the C1 field. Moreover, the time of the timer interrupt observed by the virtual machine monitor is indicated by the broken line extending in the vertical direction in the field of the symbol C3. Hereafter, the timer started by the guest OS of the virtual machine 310 is called a virtual timer, while the timer started by the virtual machine monitor is called a real timer.

In the first working example, the timing adjustment of the timer interrupt by the virtual machine monitor improves the reliability on the statistical information collected in the guest OS without changing the timer mechanism of the guest OS and without adding any modification to the guest OS. This being the case, the virtual machine monitor adjusts the timing of notifying the guest OS of the timer interrupt so that the relation between the system time viewed from the guest OS and the I/O wait time with respect to the virtual device is equalized to the relation between the system time in the physical computer and the I/O wait time with respect to the physical device. Namely, in the first working example, the timing of the timer interrupt by the virtual timer is adjusted in such a way that a timer interrupt occurrence count of the virtual timer in the guest OS is kept coincident with a timer interrupt occurrence count of the real timer in the virtual machine monitor. R1 is a ratio of the timer interrupt occurrence count in the time TSB11+TSB12 of the processes (sys-B11, sys-B12) in the kernel status of the guest OS to the timer interrupt occurrence count in the I/O wait (iowait-B1) time (TWB1) with respect to the virtual device. Further, R2 is a ratio of the timer interrupt occurrence count in the time TSB21+TSB22 of the processes (sys-B21, sys-B22) in the kernel status of the virtual machine monitor to the timer interrupt occurrence count in the I/O wait (iowait-B2) time TWB2 with respect to the physical device. In the first working example illustrated in FIG. 5, the interrupt occurrence timing of the virtual timer is modified so that R1 approximates R2.

Hereinafter, a ratio of each of the occurrence counts in the time in the kernel status and the time in the I/O wait status to the total occurrence count in the periods of time in a combined mode of the kernel status and the I/O waiting status, is called a timer density. In the first working example illustrated in FIG. 5, the timer density of the virtual timer is modified as follows. Note that the total occurrence count of the timer interrupt in the periods of time in the combined mode of the kernel status and the I/O wait status, is called a total count of the timer interrupt which accompanies the I/O process.
(a) The number of broken lines of C1 is kept coincident with the number of broken lines of C2. Then;
(b) the timer density within the period of the processes (sys-B11, sys-B12) in the kernel status of the guest OS as indicated by the arrows C21 and the timer density within the period of the processes (sys-B21, sys-B22) in the kernel status of the virtual machine monitor in the field of C3, are so modified as to be approximate to each other to the greatest possible degree. Besides;
(c) the timer density within the period of the I/O wait (iowait-B1) with the virtual device in the field of C2 and the timer density within the period of the I/O wait (iowait-B2) with the physical device in the field of C3, are so modified as to be approximate to each other to the greatest possible degree.

Through the processes described above, the timer interrupt timing is adjusted in such a direction as to set the timer densities by the process (sys-B11, sys-B12) in the kernel status of the guest OS and the process (sys-B21, sys-B22) in the kernel status of the virtual machine monitor in common. Moreover, the timer interrupt timing is adjusted in such a direction as to set the timer densities in the period of the I/O wait (iowait-B1) with the virtual device and the period of the I/O wait (iowait-B2) with the physical device in common. As a result, the ratio R1 is made approximate to the ratio R2.

For example, in the virtual machine monitor 301 according to a comparative example in the field of C1, the timer interrupt occurrence count comes to 24 altogether in the periods of the processes sys-B11, iowait-B1 and sys-B12. More specifically, the time interrupt occurs twice, twenty times and twice in the respective periods of the processes sys-B11, iowait-B1 and sys-B12. Speaking of a timer frequency ratio, the timer interrupt occurs at the ratio such as 1:10:1. Accordingly, the timer density is on the order of $1/12$ in each of the processes sys-B11 and sys-B12 in the kernel status. Further, the timer density in the I/O wait (iowait-B1) with the virtual device is on the order of $11/12$.

On the other hand, in the first working example, as given in the field of C3, the timer interrupt occurrence count comes to 21 altogether in the periods of the processes sys-B21, iowait-B2 and sys-B22. To be more specific, the timer interrupt occurs seven times, seven times and seven times in the respective periods of the processes sys-B21, iowait-B2 and sys-B22. Speaking of the timer frequency ratio, the timer interrupt occurs at the ratio such as 1:1:1. Accordingly, the timer density is on the order of $1/3$ in each of the processes sys-B21 and sys-B22 in the kernel status. Moreover, the timer density in the I/O wait (iowait-B2) with respect to the physical device is on the order of $1/3$.

In short, the ratio of the timer interrupt occurrence count in the kernel status to the timer interrupt occurrence count in the I/O waiting status of the guest OS according to the comparative example is not coincident with the ratio in the case of the virtual machine monitor in the first working example or in the case of the physical OS in the physical computer. It should be noted that the ratio of the timer interrupt occurrence count in the kernel status to the count in the I/O waiting status of the virtual machine monitor according to the first working example may be considered to be the same as the ratio in the case of the physical OS in the physical computer.

Such being the case, in the field of C2 according to the first working example, the timing when the virtual machine monitor notifies the guest OS of the virtual timer interrupt is adjusted so that the virtual timer interrupt occurs eight times, eight times and eight times in the respective processes, i.e., in terms of the timer density, the virtual timer interrupt occurs at a ratio such as 1/3:1/3:1/3 to the greatest possible degree. As a result of the timing adjustment, as obvious from the comparison between C2 and C3 in FIG. 5, the timer densities become common within the period of sys-B11 and within the period of sys-B21 in the field C2. Further, the timer densities become common within the period of iowait-B1 in the field C2 and within the period of iowait-B2 in the field C3. Moreover, the timer densities become common within the period of sys-B12 in the field C2 and within the period of sys-B22 in the field C3.

According to FIG. 5, in the fields of C1 and C2, the total timer interrupt count accompanying one single I/O process is the same (common), and hence there is no error in timer between the guest OS 310B of the virtual machine 310 according to the comparative example and the guest OS according to the first working example.

On the other hand, due to the adjustment of the virtual timer interrupt timing, the occurrence of a deviation in timing between the virtual timer of the guest OS according to the first working example and the physical timer of the virtual machine monitor, is seen between the processes sys-B11, iowait-B1, sys-B12 in the guest OS as shown in C2 and the processes sys-B11, iowait-B1, sys-B12 of the virtual machine monitor as shown in C3. Accordingly, the timing deviation observed by the guest OS according to the first working example is limited to within the range in which to operate in the kernel status. The OS is designed to operate in several milliseconds in the kernel status. Hence, there is a low possibility that the timing deviation observed by the guest OS might affect the time information detected by the application program.

<Configuration of Virtual System>

Figure 6:
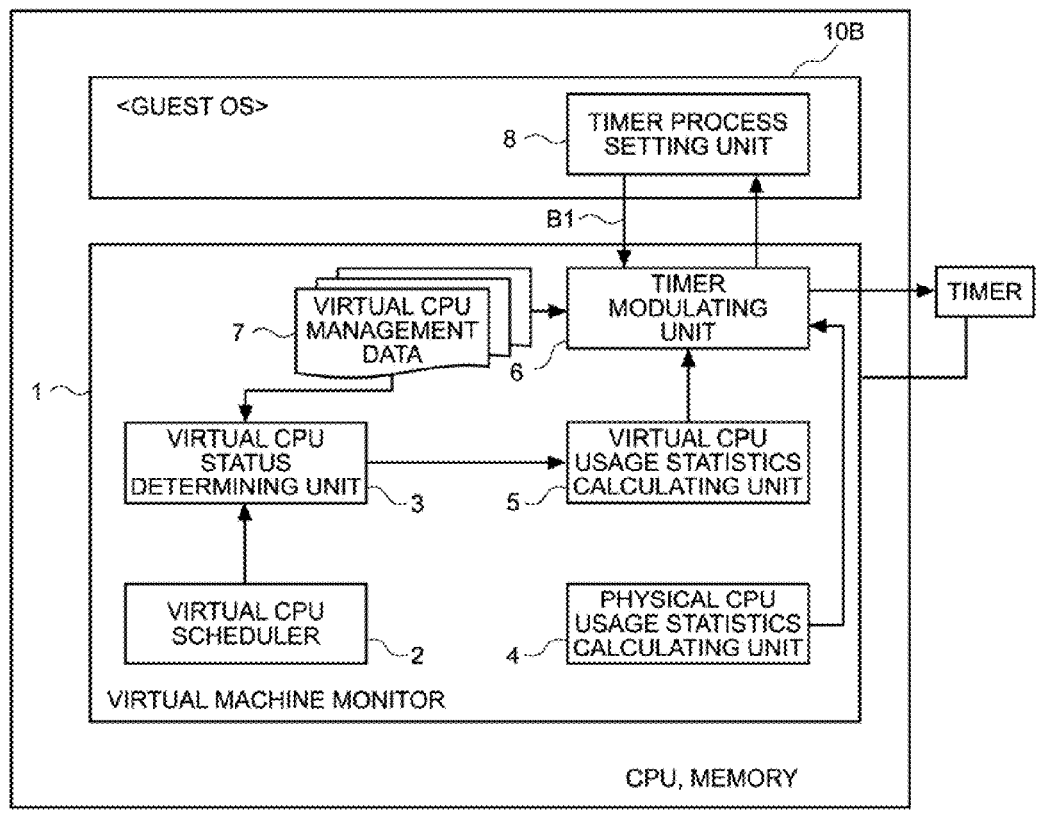
FIG. 6 is a diagram illustrating an example of a configuration of the virtual machine according to the first working example.

FIG. 6 illustrates an example of a configuration of a virtual system 11 as the computer system according to the first working example. The virtual system 11 in FIG. 6 includes a physical CPU, a memory and a timer. Further, the memory retains computer programs including a virtual machine monitor 1 and a guest OS 10B. Hereinafter, the physical CPU is simply referred to as the CPU. It should be noted that in the first working example, the whole computer system including the hardware such as the physical CPU, the memory and the timer, the virtual machine monitor and the guest OS executed on the virtual machine monitor, is termed a virtual system 11.

As in FIG. 6, the virtual machine monitor 1 has a virtual CPU scheduler 2, a virtual CPU status determining unit 3, a physical CPU usage statistics calculating unit 4, a virtual CPU usage statistics calculating unit 5 and a timer modulation unit 6. The physical CPU of the virtual system 11 executes the computer program as the virtual machine monitor 1 including the virtual CPU scheduler 2, the virtual CPU status determining unit 3, the physical CPU usage statistics calculating unit 4, the virtual CPU usage statistics calculating unit 5 and the timer modulating unit 6. Further, the virtual system 11 includes, on the memory, virtual CPU management data 7 managed by the virtual machine monitor 1. On the other hand, the guest OS 10B has a timer process setting unit 8. The physical CPU of the virtual system 11 executes the computer program as the guest OS 10B including the timer process setting unit 8.

<Process Scheduler and Virtual CPU Scheduler>

In the first working example, the virtual machine monitor 1 handles a plurality of virtual CPUs and allocates the physical CPU to the virtual CPU. The virtual CPU is defined as a concept embracing a processing status and a resource in the physical CPU in the case of allocating the physical CPU to the guest OS. Namely, the virtual CPU can be also considered to be the concept corresponding to each individual process in a multi-process environment realized by the physical OS which directly operates on the conventional physical computer. Alternatively, when viewed from the guest OS, the virtual CPU can be handled as each individual CPU in a multi-processor system.

Note that in the computer system including the virtual machine, for example, such a scheme is considered that the single guest OS separately uses the plurality of virtual CPUs, however, what is considered in the first working example is a case where one virtual CPU is prepared per guest OS.

A process of allocating the physical CPU to the virtual CPU which is requested by the guest OS to execute the process, is called "dispatch." Therefore, in order not to interfere with each other even when successively switching over the virtual CPUs, the virtual machine monitor 1, after temporarily saving an execution context such as register values into a predetermined memory area when switching over the virtual CPU, stops the in-execution virtual CPU. Then, the virtual machine monitor 1 restores again the execution context of the in-stop virtual CPU, and resumes the execution of the in-stop virtual CPU. This execution context is contained in the virtual CPU management data 7. The virtual machine monitor 1 stores the execution context of each of the plural virtual CPUs, thereby repeating the execution process, the saving process, the stop process and the resumption process. The virtual CPU scheduler 2 determines time and a sequence for allocating the virtual CPUs to the physical CPUs according to a predetermined rule.

FIG. 10 illustrates a process of the virtual CPU scheduler 2 together with a process scheduler in the physical OS. The process with the physical OS is similar in a certain aspect to a role of the virtual CPU in the virtual machine monitor 1. This being the case, in FIG. 10, the process of the process scheduler and the process of the virtual CPU scheduler 2 are depicted en bloc in one drawing. The following discussion will be focused mainly on the process with the physical OS, however, the virtual CPU in the virtual machine monitor 1 also takes the same status as the status of the process with the physical CPU.

The process scheduler has a FIFO (First In First Out) and sequentially dispatches the wait-for-allocation processes on the FIFO to the CPUs. The schedule status of the process is classified into an active status, a queued status and an unqueued status. The active status is a status of the process to which the CPU has already been allocated. The active status can be also said to be a status of the process that is in the execution by the CPU. The queued status connotes a status in which the process is in a wait-for-allocation status of the CPU on the FIFO. In the active status or the queued status, the process managed by the physical OS or the virtual CPU managed by the virtual machine monitor 1 is classified into the user status (user) or the kernel status (sys).

Furthermore, the unqueued status denotes neither a status in which the process is not in the execution by the CPU nor the wait-for-allocation status of the CPU but is a status of the process not existing on the FIFO. The process in the unqueued status is in the I/O wait status (iowait) of waiting the completion of the I/O process or in an idle status (idle) where nothing is done.

The physical OS can distinguish the idle process and the I/O wait process in the processes taking the unqueued status, which are not connected to the FIFO, from the management information per process. Similarly, the virtual machine monitor 1 can distinguish the virtual CPUs in the idle status and in the I/O wait status in the virtual CPUs taking the unqueued status, which are not connected to the FIFO, from the management information per virtual CPU.

<Calculation of Statistical Information>

As described above, the virtual system 11 classifies the process of the physical computer or the virtual CPU of the virtual system 1 into the four statuses such as the user status (user), the kernel status (sys), the I/O wait status (iowait) and the idle status (idle). These statuses are determined based on the mode and the schedule status of the CPU. The mode of the CPU is defined as a concept which specifies, for giving a distinction between the instructions executable by the CPU, a status set in the CPU or whether or not the privilege is given or an execution level. For example, the user mode is a mode having no privilege or a mode having the lowest privilege. In the first working example, the terminology "status" is used with respect to the process (or the virtual CPU) in distinction from the mode of the CPU. Such being the case, in the first working example, when the CPU which is in the execution of the process (or the real CPU allocated with the virtual CPU) is in the user node, it is said that the process (or the virtual CPU) is in the user status.

Moreover, the kernel mode is a mode having the privilege or a mode having the higher privilege than the user mode. The kernel mode may be called a privilege mode. In the case of saying the privilege mode, however, though other is a case of including modes having different levels into which the CPU's status is subdivided, there is no distinction between these modes in the first working example. According to the first working example, when the CPU which is in the execution of the process (or the real CPU allocated with the virtual CPU) is in the kernel mode or the variety of privilege modes, the process (or the virtual CPU) is said to be in the kernel status.

When the control is transferred to the guest OS 10B from the application program due to, e.g., the system call etc., the virtual CPU becomes the kernel status. In the kernel status, the virtual CPU usage statistics calculating unit 5 totalizes and accumulates the elapsed time given from the timer as the system time (sys time).

In the kernel status, after transferring the data input and output to the I/O controller of the physical device from, e.g., the device driver, the virtual CPU (process) is linked to the queue and the execution of the virtual CPU (process) is temporarily stopped, at which time the virtual CPU (process) comes to the I/O wait status. In the I/O wait status, the virtual CPU usage statistics calculating unit 5 totalizes and accumulates the elapsed time given from the timer as the I/O wait time (iowait time).

If neither in the in-execution status of the user process nor in the in-execution status of the system call nor in the I/O wait status, the virtual CPU (process) becomes the idle status (idle). In the idle status, the virtual CPU usage statistics calculating unit 5 totalizes and accumulates the elapse time given from the timer as the idle time (idle time).

The virtual machine monitor 1, the guest OS or the physical OS distinguishes between the I/O wait time and the idle time, corresponding to a cause of why the process scheduler or the virtual CPU scheduler 2 sets the process or the virtual CPU in the unqueued status which will be described later on. For instance, in the physical computer, the device driver executed by the physical OS transfers the I/O request to the unillustrated I/O controller in response to a data transfer instruction and temporarily stops the process, in which case the processing time measured in the temporarily-stopped status of the process becomes the I/O wait time. Moreover, if the process comes to the unqueued status due to a cause other than the I/O request, the processing time becomes the idle time.

FIG. 9 illustrates a type of the time measured by the virtual machine 10. Each period of time is the time based on the CPU cycle and is measured based on, e.g., the occurrence of the timer interrupt as one unit. The user time is the time when executing the application program or an accumulated total of time thereof. The system time (sys time) is the time when executing codes of a kernel program or an accumulated total of time thereof. The I/O wait time (iowait time) is the time when executing neither the application program nor the kernel program as well as being the standby time till the process of the device is completed, or an accumulated total of time thereof. The idle time (idle time) is the time when executing neither the application program nor the kernel program as well as being the non-standby time till the process of the physical device is completed, or an accumulated total of time thereof.

The physical CPU usage statistics calculating unit 4 totalizes the periods of elapse time in a way that categorizes the elapsed time into the user time, the sys time, the iowait time and the idle time in accordance with the user status, the sys status, the iowait status and the idle status of the process that is in the execution by the physical CPU. Note that in FIG. 6, the physical CPU usage statistics calculating unit 4 exists within the virtual machine monitor 1.

The virtual CPU usage statistics calculating unit 5 also totalizes the elapsed time in the same way as the physical CPU usage statistics calculating unit 4 does, however, a different point is that the elapsed time in the virtual CPU is totalized corresponding to the status of the virtual CPU.

As already stated, the virtual CPU can be said to be the computer resource when executing the guest OS on the physical CPU and the execution environment including the register set. To the virtual CPU, the physical CPU is allocated by the virtual CPU scheduler 2 of the virtual machine monitor 1. Then, the execution environment such as the register set of the virtual CPU is handed over to the guest OS 10B, whereby the guest OS 10B is started up. The startup of the guest OS 10B triggers a start of the process of the virtual CPU. The virtual CPU status determining unit 3 determines the status, i.e., user, sys, iowait or idle, of the virtual CPU by use of various items of data (refer to <Management Data and Data Structure>) retained within the virtual machine monitor 1.

The virtual CPU usage statistics calculating unit 5 identifies the status of the virtual CPU according to the determination of the virtual CPU status determining unit 3 and totalizes, for a predetermined period, the user time, the system time (sys time), the I/O wait time (iowait time) and the idle time, thereby calculating an accumulated value of each length of time.

<Management Data and Data Structure>

FIG. 8 illustrates an example of the virtual CPU management data 7. The execution context is the data representing the status of each individual virtual CPU. The execution context is exemplified such as the register values. When switching over the guest OS, the execution context at the OS execution time, which has so far been executed before the switchover, is saved into the memory. On the other hand, the registers are set based on the execution context remaining saved in the memory for the guest OS that is executed after the switchover, and the guest OS executed after the switchover is started up.

An exit flag is a flag used for the virtual CPU to determine whether the status is the user status (user) or the kernel status (sys). The guest OS 10B executes the privilege instruction, and, before the process is shifted to the virtual machine monitor 1, the virtual machine monitor 1 sets "1" in the exit flag with respect to the virtual CPU that is in the execution of the guest OS 10B. Reversely, when the process returns to the guest OS 10B from the virtual machine monitor 1, the virtual machine monitor 1 sets "0" in the exit flag. The virtual system 11 uses the exit flag as one determining element for the virtual CPU status determining unit 3.

A wait-for-completion I/O count indicates the number of the not-yet-completed I/O processes in the I/O request issued by the guest OS 10B. The wait-for-completion I/O count is calculated, e.g., in the following procedures. When the control is transferred to the virtual machine monitor 1 as triggered by the I/O request given from the guest OS 10B, the virtual machine monitor 1 adds "1" to the wait-for-completion I/O count. Then, on the occasion of sending an I/O response back to the guest OS 10B upon the completion of the physical I/O, the virtual machine monitor 1 subtracts "1" from the wait-for-completion I/O count. The wait-for-completion I/O count also becomes the determination element of the virtual CPU status determining unit 3.

In the first working example, the virtual machine monitor 1 calculates the wait-for-completion I/O count per guest OS 10B. In the first working example, however, the thus-calculated wait-for-completion I/O count per guest OS 10B is retained in the virtual CPU management data 7 in the way of being identifiable by the virtual CPU which executes the guest OS 10B. A premise in the first working example is that one guest OS 10B is to be executed by one virtual CPU, and hence the virtual CPU status determining unit 3 can, if the virtual CPU can be specified, acquire the wait-for-completion I/O count in the virtual CPU.

FIG. 11 illustrates a virtual CPU status table used for the virtual machine monitor 1 to identify the status (user, sys, iowait, idle) of the virtual CPU. The virtual CPU status table is contained in the virtual CPU management data 7 in FIG. 6.

The virtual CPU status table in FIG. 11 contains "execution status" in the first column, "exit flag" in the second column and "wait-for-completion I/O count" in the third column. The execution status connotes any one of the statuses, i.e., the active status, the queued status and the unqueued status of the process explained in FIG. 10. The virtual machine monitor 1 queries the virtual CPU scheduler 2 about the execution status of the virtual CPU. On the other hand, as already described in FIG. 8, the exit flag and the wait-for-completion I/O count are retained in the virtual CPU management data 7.

Accordingly, if the execution status of the virtual CPU is the active status or the queued status, the virtual machine monitor 1 can identify the status of the virtual CPU with user or sys from the value of the exit flag.

If the virtual CPU is in the unqueued status, however, the virtual machine monitor 1 is hard to determine which status, idle or iowait, the process (virtual CPU) takes. The virtual machine monitor 1 acts as a proxy in the input and output given from the guest OS 10B, which does not, however, mean that the virtual machine monitor 1 manages the I/O request count and a process completion count in the guest OS 10B. Therefore, in the first working example, the information representing the wait-for-completion I/O count is provided in the virtual CPU management data 7. Then, the virtual machine monitor 1 increments or decrements the wait-for-completion I/O count when the I/O request is given from each guest OS 10B and when completing the real I/O for the input and output, and retains the incremented or decremented wait-for-completion I/O count per guest OS 10B. Then, when the virtual CPU is in the unqueued status, the virtual machine monitor 1, if the wait-for-completion I/O count is larger than "0", identifies the status of the virtual CPU with iowait. Further, when the virtual CPU is in the unqueued status, the virtual machine monitor 1, if the wait-for-completion I/O count is "0", identifies the status of the virtual CPU with idle. The assumption in the first working example is that one guest OS is executed by one virtual CPU, and hence the virtual machine monitor 1 retains the wait-for-completion I/O count per virtual CPU. Accordingly, the virtual machine monitor 1 can identify the status of the virtual CPU from the wait-for-completion I/O count per virtual CPU.

Incidentally, to add a few more words, if one guest OS 10B is executed by a plurality of virtual CPUs, the process may simply be changed as follows. To be specific, if one guest OS 10B is executed by the plurality of virtual CPUs, the guest OS 10B is associated with a specified virtual CPU called a virtual primary CPU. The guest OS 10B is, when booted for the first time, started up by, at first, the virtual primary CPU and is thereafter executed by one other virtual CPU as the case may be. This being the case, the wait-for-completion I/O count may simply be retained in the virtual CPU management data 7. Accordingly, the virtual CPU status determining unit 3 can, if capable of specifying the virtual primary CPU, acquire the wait-for-completion I/O count in the guest OS 10B executed by the virtual primary CPU. Namely, the wait-for-completion I/O count of the plurality of virtual CPUs as a whole is deemed to be the wait-for-completion I/O count of the individual virtual CPUs by holding the totalized wait-for-completion I/O count of the plurality of virtual CPUs by way of the information of the virtual primary CPU, and approximately each individual virtual CPU may identify the status with iowait or idle.

<Description of Timer Process>

A timer process in the virtual machine will hereinafter be described. The timer process of the guest OS 10B is basically the same as the timer process of the physical computer. In the timer process, to begin with, a callback function is registered in the timer, and, when a specified period of time elapses, the timer interrupt occurs. As triggered by this timer interrupt, the physical OS, after canceling the callback function from the timer, invokes the callback function. As for the callback function, after performing a predetermined process that should be cyclically done with the timer interrupt, the callback function is again registered in the timer. With this process, it follows that the callback function is cyclically invoked. The callback function is also called a handler or an interrupt processing program. Specific implementation of the timer is different depending on the physical OS.

The following is a different point of the timer process of the guest OS 10B from the timer process of the physical computer. A timer registration process involves the privilege instruction. Therefore, when executing the process of registering the callback function in the timer, the control is temporarily transferred to the virtual machine monitor 1 from the guest OS 10B. The virtual machine monitor 1, after the elapse of the time specified by the guest OS 10B, generates the virtual timer interrupt to the guest OS 10B, and further wakes up the virtual CPU. The phrase "wakes up the virtual CPU" refers to "allocates the physical CPU to the virtual CPU after restoring the execution context of the guest OS 10B that is executed by the virtual CPU." The virtual machine monitor 1, however, sets the occurrence of the timer interrupt in the execution context handed over to the guest OS 10B. Thereupon, after waking up the virtual CPU, the guest OS 10B receives the virtual timer interrupt. Based on the method described so far, the virtual machine monitor 1 virtually acts as the proxy to execute the timer process started up from the guest OS 10B. In the first working example, the virtual machine monitor 1 includes the timer modulation unit 6 and executes the timer adjusting process illustrated in FIG. 5 by properly modifying the time specified by the virtual machine 10.

Figure 7:
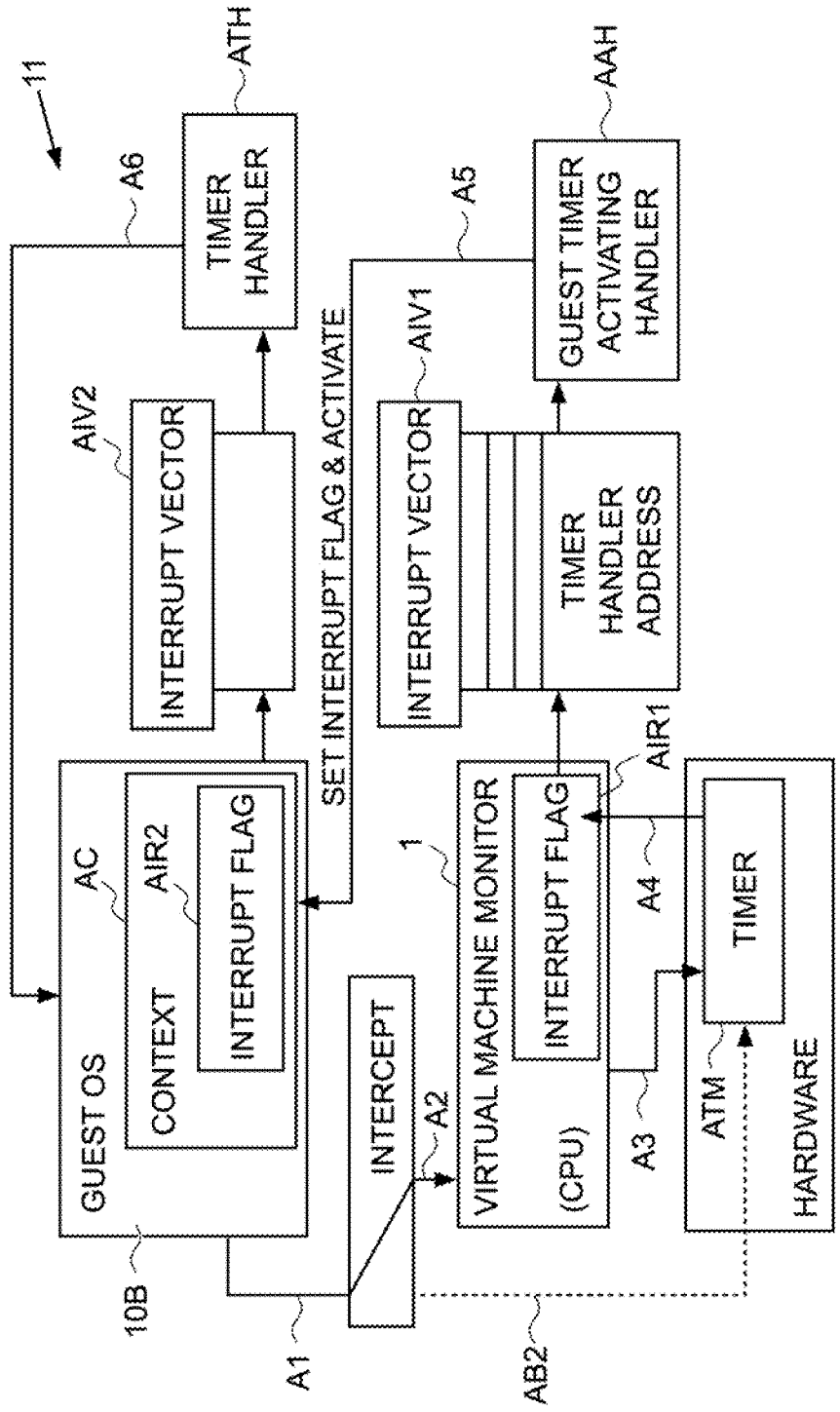
FIG. 7 is a diagram illustrating components related to a process when setting a timer interrupt and after occurrence of the timer interrupt.

FIG. 7 illustrates components related to the processes when setting the timer interrupt and after the occurrence of the timer interrupt. It is assumed that the virtual system 11 includes one physical CPU. The guest OS 10B is executed on one physical CPU. The guest OS 10B sets the timer interrupt in the hardware timer at a first timer interval (arrow A1). In the physical computer other than the virtual system 11, the timer interrupt is set in a hardware timer ATM via a route depicted by dotted line AB2 in FIG. 7.

The setting of the timer interrupt is of the privilege instruction, and hence, in the case of the virtual system 11, an exception occurs in the physical CPU. With the exception, the control is transferred to the virtual machine monitor 1 from the guest OS 10B. The virtual machine monitor 1, to which the control is transferred from the guest OS 10B, intercepts the setting request of the timer interrupt from the guest OS 10B (arrow A2). The term "intercept" refers to receiving, in place of the hardware timer ATM, such timer setting that the guest OS 10B sets the occurrence of the timer interrupt after the elapse of a setting period in the hardware timer ATM. In the virtual machine 10 according to the first working example, the virtual machine monitor 1 intercepts the timer setting through the exception handling. As a result of the intercept, the guest OS 10B does not set the timer interrupt in the hardware timer. Note that the physical CPU executes the computer program deployed on the memory as a unit that receives the timer setting in place of the hardware timer ATM.

The virtual machine monitor 1, which has intercepted the timer setting by the guest OS 10B, sets the timer interrupt in the hardware timer ATM at a second timer interval modulated as a substitute for the first timer interval set by the guest OS 10B (arrow A3). On the occasion of setting the timer interrupt, the virtual machine monitor 1 sets an address of a guest timer activating handler AAH in an interrupt vector AIV1 that is processed when the timer interrupt is occurred. The timer handler is defined as a function that is started up when the timer interrupt is occurred. In FIG. 7, the guest timer activating handler AAH is also started up when the timer interrupt is occurred and notifies the guest OS 10B of the timer interrupt.

Upon the occurrence of the timer interrupt, an interrupt flag is set in a timer interrupt register AIR1 (A4), and the guest timer activating handler AAH is started up based on the address set in the interrupt vector AIV1 associated with the timer interrupt.

The started-up guest timer activating handler AAH sets the interrupt flag in a timer interrupt register AIR2 in an execution context AC containing the content of the register set of the guest OS 10B, and transmits a virtual interrupt to the guest OS 10B (arrow A5).

When the guest OS 10B receives the virtual interrupt, the control is transferred to the timer handler ATH (with its address) set in the interrupt vector ATV2, and the timer process is executed. After the process of the timer handler ATH, the control is shifted to the normal process of the guest OS 10B (arrow A6). With the configuration described above, the virtual machine monitor 1 sets the timer interrupt in the hardware timer ATM at the second timer interval modulated in place of the first timer interval set by the guest OS 10B. Then, the virtual machine monitor 1 notifies, in place of the hardware timer ATM, the guest OS 10B of the virtual timer interrupt.

<Timer Modulating Unit>

Figure 12:
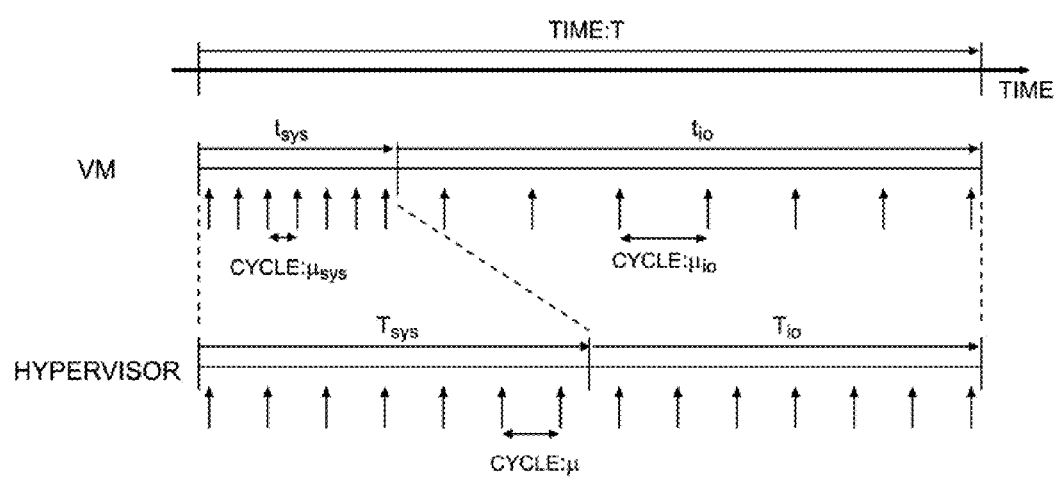
FIG. 12 is a diagram illustrating a processing flow of a virtual CPU status determining means.

A method of how the timer modulating unit 6 adjusts the timer cycle specified by the guest OS 10B will hereinafter be described. FIG. 12 illustrates a relation between a timer cycle $\mu$ set by the guest OS 10B and virtual timer cycles $\mu_{sys}$ and $\mu_{io}$ which are returned by the virtual machine monitor 1 (VMM) to the guest OS 10B.

In the period indicated by $t_{sys}$ and the period indicated by $T_{sys}$ in FIG. 12, a relation between the timer cycle $\mu$ set by the guest OS 10B and the virtual timer cycle $\mu_{sys}$ returned by the virtual machine monitor 1 to the guest OS 10B, is expressed in the following formula 1.

$$\mu_{sys}=\mu \cdot t_{sys}/T_{sys}$$ Formula 1

In the formula 1, $t_{sys}$ corresponds to a period (e.g., TSB11+TSB12 in FIG. 4B) during the execution of the kernel program recognized by the guest OS 10B in the single I/O (which is the process ranging from the I/O request to the I/O reception in FIGS. 4 and 5). Further, $T_{sys}$ corresponds to a period (e.g., TSB21+TSB22 in FIG. 4B) during the execution of the kernel program recognized by the virtual machine monitor 1 in the single I/O. Actually, $t_{sys}$ can be obtained as an accumulated value into which to accumulate, for a predetermined period, the execution time of the kernel program that is calculated by the virtual CPU usage statistics calculating unit 5. Herein, the "accumulated value" is meant to be a total value collected for the predetermined period. An average value obtained in the predetermined period throughout may, however, be used as the accumulated value. As a substitute for the accumulated value of the execution time calculated by the virtual CPU usage statistics calculating unit 5, however, there may be used the execution time, during the predetermined period, of the kernel program contained in the usage statistics calculated in the past by the guest OS 10B. As a matter of course, the usage statistics calculated in the past by the guest OS 10B may involve employing the usage statistics in a non-modulation status of the virtual timer cycle $\mu_{sys}$ based on the formula 1. The period $t_{sys}$ corresponds to a reference value of the processing time in the privilege status recognized by the guest OS.

Further, $T_{sys}$ can be obtained as the accumulated value into which to accumulate the execution time of the kernel program that is calculated by the physical CPU usage statistics calculating unit 4. The period $t_{sys}$ corresponds to the reference value of the processing time in the privilege mode recognized by the virtual machine monitor 1.

As a timer cycle which replaces the timer cycle $\mu$ set by the guest OS 10B, a timer cycle $\mu_{sys}$ modulated so that an occurrence frequency of the virtual timer interrupt generated in the period $t_{sys}$ gets coincident with an occurrence frequency of the physical timer interrupt generated in the period $T_{sys}$, is determined by the formula 1. According to the formula 1, it follows that the timer cycle is modulated at a ratio such as $t_{sys}/T_{sys}$.

To transform the formula 1, a relation is established such as $t_{sys}/\mu_{sys}=T_{sys}/\mu$, whereby the virtual timer is modulated in such a direction that the occurrence count of the timer interrupt generated at the interval $\mu_{sys}$ recognized by the guest OS 10B within the accumulation time $t_{sys}$ becomes coincident with the occurrence count of the timer interrupt generated at the interval $\mu$ recognized by the virtual machine monitor 1 in the accumulation time $T_{sys}$. Namely, the timer density of the virtual timer in the period $t_{sys}$ is common to the timer density of the physical timer in the period $T_{sys}$.

On the other hand, in the period indicated by $t_{io}$ and the period indicated by $T_{io}$ in FIG. 12, a relation between the timer cycle $\mu$ set by the guest OS 10B and the virtual timer cycle $\mu_{io}$ returned by the virtual machine monitor 1 to the guest OS 10B, is expressed in the following formula 2.

$$\mu_{io}=\mu \cdot t_{io}/T_{io}$$ Formula 2

In the formula 2, $t_{io}$ corresponds to the I/O wait period (e.g., TWB1 in FIG. 4B) with respect to the virtual device recognized by the guest OS 10B in the single I/O (which is the process ranging from the I/O request to the I/O reception in FIGS. 4 and 5). Further, $T_{io}$ corresponds to an I/O wait period (e.g., TWB2 FIG. 4B) with respect to the physical device recognized by the virtual machine monitor 1 in the single I/O. Actually, $t_{io}$ can be obtained as an accumulated value of the I/O wait time calculated by the virtual CPU usage statistics calculating unit 5. In place of the accumulated value $t_{io}$ calculated by the virtual CPU usage statistics calculating unit 5, there may be used the I/O wait time during the predetermined period contained in the usage statistics calculated by the guest OS 10B. As a matter of course, the usage statistics calculated in the past by the guest OS 10B may involve employing the usage statistics in the non-modulation status of the virtual timer cycle $\mu_{io}$ based on the formula 2. The period $t_{io}$ corresponds to a reference value of the I/O wait time recognized by the guest OS. Moreover, $T_{io}$ is the accumulated value of the I/O wait time during the predetermined period calculated by the physical CPU usage statistics calculating unit 4. The period $T_{io}$ corresponds to the reference value of the I/O wait time recognized by the virtual machine monitor.

As a timer cycle which replaces the timer cycle $\mu$ set by the guest OS 10B, a timer cycle $\mu_{io}$ modulated so that the occurrence frequency of the virtual timer interrupt generated in the period $t_{io}$ gets coincident with the occurrence frequency of the physical timer interrupt generated in the period $T_{io}$, is determined by the formula 2.

To transform the formula 2, a relation is established such as $t_{io}/\mu_{io}=T_{io}/\mu$, whereby the occurrence count of the timer interrupt generated at the interval $\mu_{io}$ recognized by the guest OS 10B within the accumulation time $t_{io}$ becomes coincident with the occurrence count of the timer interrupt generated at the interval $\mu$ recognized by the virtual machine monitor 1 in the accumulation time $T_{io}$. Therefore, the timer is modulated in such a direction that the occurrence count of the timer interrupt in the I/O wait time recognized by the guest OS 10B becomes coincident with the occurrence count of the timer interrupt in the I/O wait time recognized by the virtual machine monitor 1. Namely, the timer density of the virtual timer in the period tio is common to the timer density of the physical timer in the period $T_{io}$.

Further, there is established a relation such as $t_{sys}/\mu_{sys}+t_{io}/\mu_{io}=(T_{sys}+T_{io})/\mu$, and hence the total interrupt count in the kernel status and in the I/O wait status, which is recognized by the guest OS 10B, coincides with the total interrupt count recognized by the virtual machine monitor 1.

Figure 13:
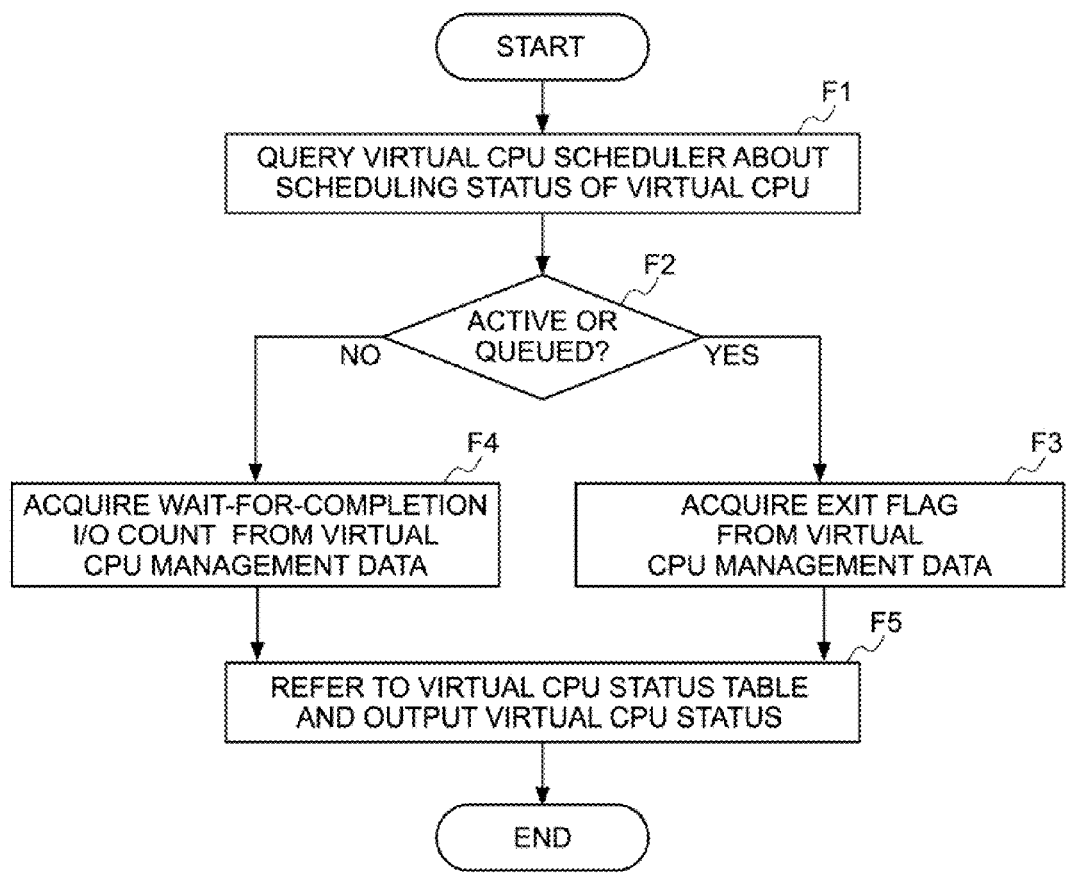
FIG. 13 is a diagram illustrating a relation between a timer cycle μ set by the guest OS and a virtual timer cycle returned by the virtual machine monitor to the guest OS.

FIG. 13 illustrates a processing flow of the virtual CPU status determining unit 3. The virtual CPU status determining unit 3 manages and refers to the virtual CPU status table in FIG. 11, thus determining the status of the virtual CPU. For example, the virtual CPU status determining unit 3, in response to the request given from the virtual CPU usage statistics calculating unit 5, determines the status of each virtual CPU.

The physical CPU serving as the virtual CPU status determining unit 3 executes the computer program. In the first working example, however, the discussion will proceed on the assumption that the virtual CPU status determining unit 3 performs the process in FIG. 13. In the process of FIG. 13, the virtual CPU status determining unit 3 queries the virtual CPU scheduler 2 about the schedule status of each virtual CPU (F1). Then, the virtual CPU status determining unit 3 determines, based on a response given from the virtual CPU scheduler 2, which status, the active status or the queued status or alternatively neither the active status nor the queued status, each virtual CPU takes (F2).

If the virtual CPU is in the active status or the queued status (F2; YES), the virtual CPU status determining unit 3 acquires the exit flag from the virtual CPU management table (F3). Then, the virtual CPU status determining unit 3 advances the control to F5. Whereas if the virtual CPU is in neither the active status nor the queued status, i.e., the virtual CPU is in the unqueued status (F2; NO), the virtual CPU status determining unit 3 advances the control to F4. In this case, the virtual CPU status determining unit 3 acquires the wait-for-completion I/O count from the virtual CPU management data (F4).

Then, the virtual CPU status determining unit 3 determines the status of the virtual CPU, which is, i.e., any one of user, sys, iowait and idle, by referring to the virtual CPU status table in a way that uses the exit flag acquired in F3 or the wait-for-completion I/O flag acquired in F4, and outputs the result of the determination to the virtual CPU usage statistics calculating unit 5 (F5).

For instance, if the virtual CPU is in the active status or the queued status and if the value of exit flag is "0", the virtual CPU status determining unit 3 outputs the user status (user). Moreover, if the virtual CPU is in the active status or the queued status and if the value of Exit flag is "1", the virtual CPU status determining unit 3 outputs the kernel status (sys). If the virtual CPU is in neither the active status nor the queued status (unqueued) and if the wait-for-completion I/O count is equal to or smaller than "0", the virtual CPU status determining unit 3 outputs the idle. If the virtual CPU is in neither the active status nor the queued status (unqueued) and if the wait-for-completion I/O count is equal to or larger than "1", the virtual CPU status determining unit 3 outputs the I/O wait (iowait).

As described above, the virtual CPU status determining unit 3 distinguishes between user, sys, iowait and idle, and therefore, if the virtual machine monitor 1 periodically monitors, e.g., the status of the virtual CPU, the virtual CPU usage statistical information can be calculated.

Figure 14:
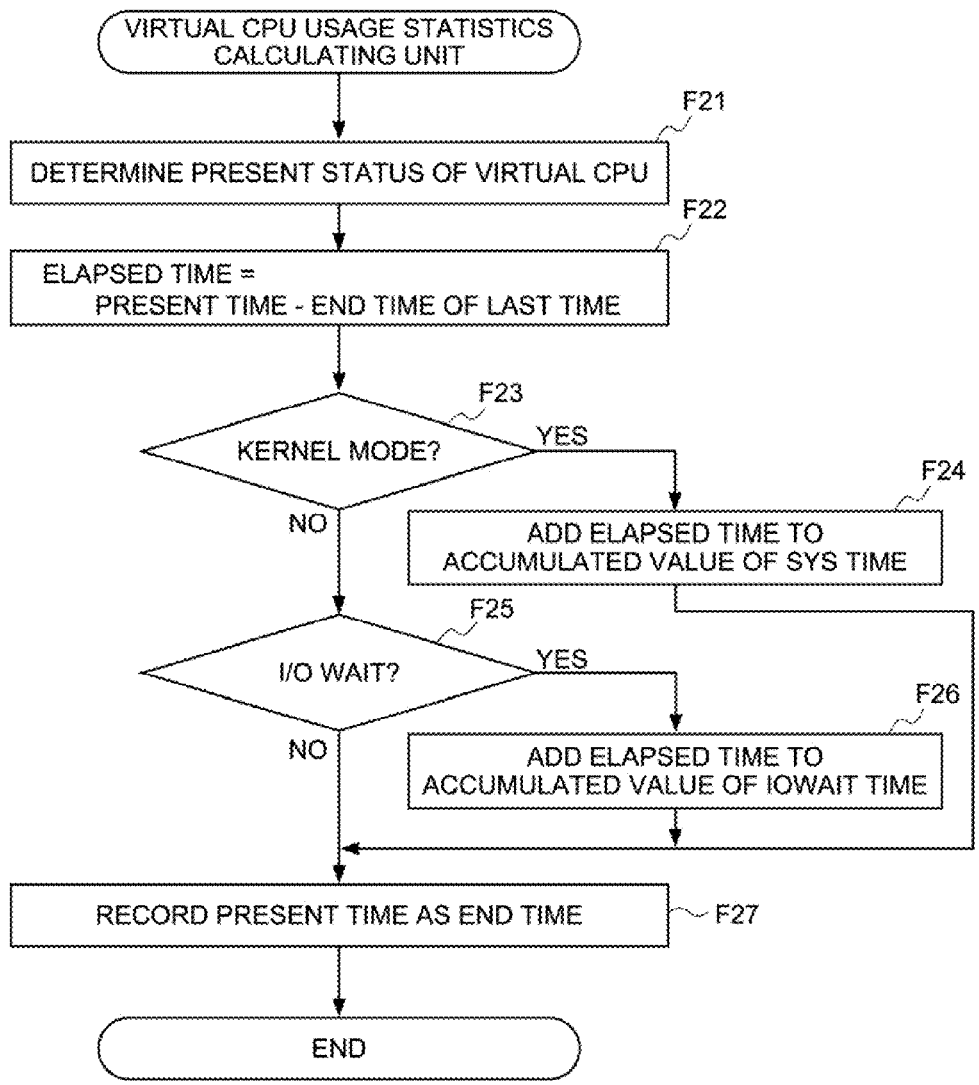
FIG. 14 is a diagram illustrating a processing flow of a virtual CPU usage statistics calculating unit.

FIG. 14 illustrates a processing flow of the virtual CPU usage statistics calculating unit 5. The physical CPU serving as the virtual CPU usage statistics calculating unit 5 executes the computer program contained in the virtual machine monitor 1. The following discussion will proceed on the assumption that the virtual CPU usage statistics calculating unit 5 executes the process in FIG. 14. The process in FIG. 14 is started up when the virtual CPU scheduler 2 switches over the status of each virtual CPU to the active status or the queued status or the unqueued status or when the wait-for-completion I/O count changes.

Note that the process in FIG. 14 may be started up at a predetermined time interval. If the process in FIG. 14 is started up at the predetermined time interval, for example, as compared with the period for which the status (user, sys, iowait, idle) of the virtual CPU changes, the process in FIG. 14 may be started up at a short time interval that is allowable as an error.

The virtual CPU usage statistics calculating unit 5, to begin with, determines the present status, i.e., "user, sys, iowait and idle" of the virtual CPU (F21). The present status of the virtual CPU is determined in the process of the virtual CPU status determining unit 3 in FIG. 13.

Next, the virtual CPU usage statistics calculating unit 5 subtracts the process end time of the last time from the present time, and obtains the elapsed time from the end of the process of the past time (F22). The present time is the present time recognized by the virtual machine monitor 1 when executing the process in F22.

Next, the virtual CPU usage statistics calculating unit 5 determines whether the present status, obtained in F11, of the virtual CPU is the kernel status (sys) or not (F23). If the present status of the virtual CPU is the kernel status (sys) (F23; YES), the virtual CPU usage statistics calculating unit 5 adds the elapsed time calculated in F22 to the accumulated value $t_{sys}$ of the sys time (F24). Then, the virtual CPU usage statistics calculating unit 5 shifts the control to F27.

Whereas if the present status of the virtual CPU is not the kernel status (sys) (F23; NO), the virtual CPU usage statistics calculating unit 5 determines whether or not the present status, obtained in F21, of the virtual CPU is the I/O wait (iowait) status (F25). If the present status of the virtual CPU is the I/O wait (iowait) status (F25; YES), the virtual CPU usage statistics calculating unit 5 adds the elapsed time calculated in F21 to the accumulated value $t_{io}$ of the iowait time (F26). Then, the virtual CPU usage statistics calculating unit 5 shifts the control to F27.

Next, the virtual CPU usage statistics calculating unit 5 records the present time as the end time in a static memory, e.g., the shared memory (F27). Then, the virtual CPU usage statistics calculating unit 5 finishes the process.

Note that in the process of FIG. 14, though omitted, it is feasible to similarly calculate the user time when the virtual CPU is kept in the user status or the idle time when the virtual CPU is kept in the idle status.

Further, the process of the physical CPU usage statistics calculating unit 4 is, except the point that the process is executed by the virtual machine monitor 1, the same as the process executed by the conventional physical OS. Namely, the virtual machine monitor 1 is capable of handling the process on the Hypervisor similarly to the process of the physical OS in the physical computer. Accordingly, the physical CPU usage statistics calculating unit 4 can determine whether the status of the process on the Hypervisor is the user status (user), the kernel status (sys), the wait-for-completion I/O status (iowait) or the idle status (idle). It is to be noted that the case in which the status of the process on the Hypervisor is the kernel status can be exemplified by a case in which the process (sys-B21, sys-B22) of the real I/O driver in FIG. 4B is in the execution. Accordingly, for instance, the physical CPU usage statistics calculating unit 4 may, if in the execution of the process of the real I/O driver illustrated in FIG. 4B, determine that the status of the process on the Hypervisor is the kernel status. Then, the physical CPU usage statistics calculating unit 4 sets the execution time (sys time) in the kernel status in the predetermined accumulated period to the accumulated value $T_{sys}$. Further, the physical CPU usage statistics calculating unit 4 sets the I/O wait time (iowait time) in the predetermined accumulated period to the accumulated value $T_{io}$.

Figure 15:
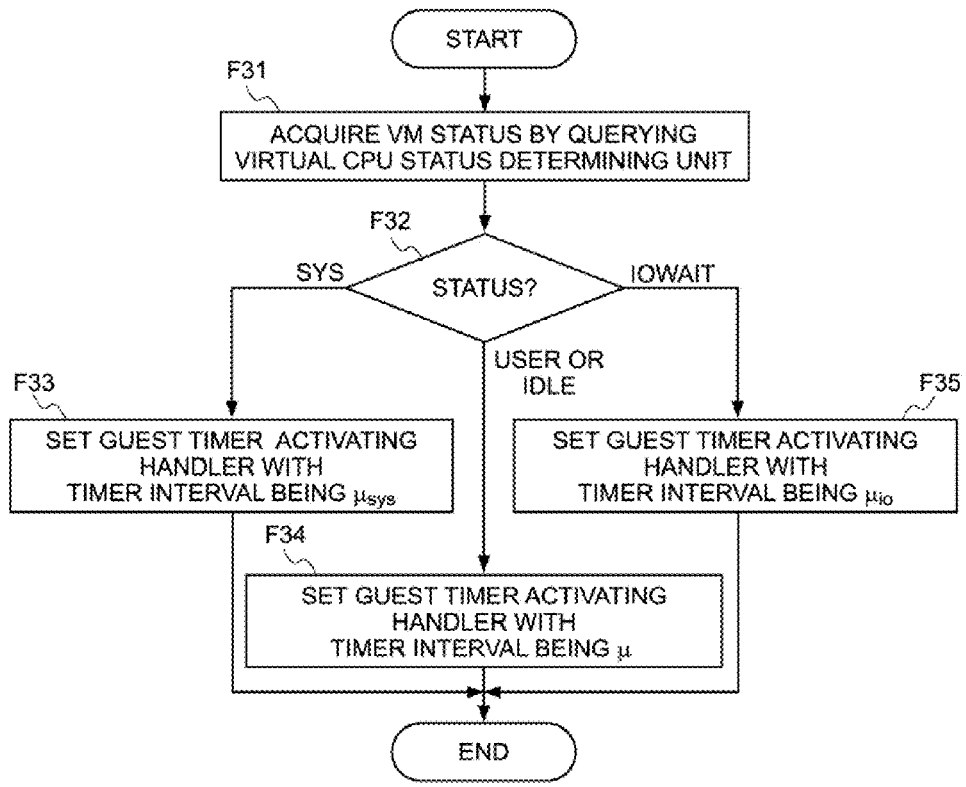
FIG. 15 is a diagram illustrating a processing flow when a timer modulation unit sets the timer.
Figure 16:
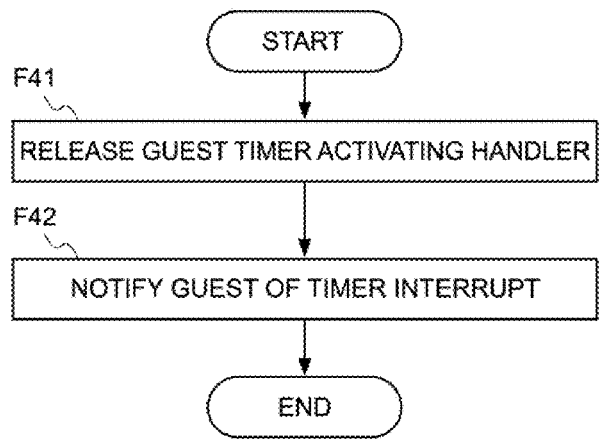
FIG. 16 is a diagram illustrating a processing flow when the timer modulation unit transfers the virtual timer interrupt to the guest OS.

FIGS. 15 and 16 illustrate a processing flow of the timer modulation unit 6. The physical CPU serving as the timer modulation unit 6 executes the computer program contained in the virtual machine monitor 1. The following discussion will be made on the assumption that the timer modulation unit 6 executes the processes in FIGS. 15 and 16. The timer modulation unit 6 modulates the virtual timer interrupt occurrence time transferred to the guest OS 10B in accordance with the formulae 1 and 2. The timer cycle μ is the cycle specified by the guest OS 10B, and hence the timer modulation unit 6 calculates the timer cycle modulated corresponding to the result of the virtual CPU status determining unit 3. FIG. 15 depicts the process when setting the timer, and FIG. 16 illustrates the process when transferring, after the occurrence of the timer interrupt, the virtual timer interrupt to the guest OS 10B. A program for executing the process in FIG. 16 is called a guest timer activating handler. The physical CPU serving as a unit for notifying the guest OS of the occurrence of the timer interrupt executes the process in FIG. 16 according to the computer program deployed on the memory.

When the guest OS 10B sets the timer interrupt, the setting of the timer interrupt is of the privilege instruction, and consequently an exception occurs in the physical CPU. The virtual machine monitor 1 intercepts, through the exception generated in the CPU, the setting of the timer interrupt set by the guest OS 10B, and starts up the process of the timer modulation unit 6 in FIG. 14. The CPU intercepts, based on the computer program deployed on the memory, the setting of the timer interrupt (arrow B1 in FIG. 6).

The timer modulation unit 6 queries the virtual CPU status determining unit 3 about the status of the virtual CPU, thus acquiring the status of the virtual CPU (F31). Then, the timer modulation unit 6 determines the status of the in-execution virtual CPU (F32).

If the status of the virtual CPU is the kernel status (sys), the timer modulation unit 6 calculates the post-modulating timer interval $\mu_{sys}$ according to the formula 1. Note that the timer interval μ set by the guest OS 10B can be acquired when intercepting the timer interrupt set by the guest OS 10B. Then, the timer modulation unit 6 sets, in place of the timer interval μ set by the guest OS 10B, the timer interrupt in the hardware timer, in which $\mu_{sys}$ is the post-modulating timer interval. Moreover, the timer modulation unit 6 sets the guest timer activating handler for waking up the guest OS 10B as the timer handler which accepts the set timer interrupt (F33).

If the status of the virtual CPU is the user status (user) or the idle status (idle), the timer modulation unit 6 sets, without modulating the timer interval, the timer interrupt at the timer interval μ set by the guest OS 10B (F34). Moreover, the timer modulation unit 6 sets the guest timer activating handler for waking up the guest OS 10B as the timer handler which accepts the set timer interrupt. Namely, in the modulation method in the first working example, the timer interval is not modulated in the user time and the idle time.

If the status of the virtual CPU is the I/O wait status (iowait), the post-modulating timer interval $\mu_{io}$ is calculated according to the formula 2. Then, the timer modulation unit 6 sets, as the substitute for the timer interval μ set by the guest OS 10B, sets the timer interrupt, in which $\mu_{io}$ is the post-modulating timer interval. Moreover, the timer modulation unit 6 sets the guest timer activating handler for waking up the guest OS 10B as the timer handler which accepts the set timer interrupt (F35).

Upon the occurrence of the timer interrupt set according to the process in FIG. 15, the guest timer activating handler is started up, and the process in FIG. 16 is executed. The guest timer activating handler, at first, cancels the startup setting of the guest timer activating handler when the timer interrupt is generated. Namely, the setting of the guest timer activating handler is cleared from the timer interrupt vector with respect to the timer interrupt (F41).

Next, the guest timer activating handler sets the interrupt flag in the timer interrupt register AIR2 in the execution context of the virtual CPU (see FIG. 7). Then, the guest timer activating handler starts up the guest OS 10B.

The started-up guest OS 10B sets the variety of register values contained in the context in the register of the CPU, and thus starts the process. Thereupon, it appears to the virtual CPU that the timer interrupt is generated. Namely, the guest timer activating handler notifies the virtual CPU of the virtual timer interrupt (F42). As described above, in the guest OS 10B, the timer handler is started up with the virtual timer interrupt. Accordingly, the guest OS 10B is actually notified of the interrupt at the timer interval $\mu_{sys}$ or $\mu_{io}$ and, nevertheless, behaves as if notified of the interrupt at the timer interval μ.

As discussed above, according to the virtual system 11 in the first working example, the virtual CPU usage statistics calculating unit 5 calculates the accumulated value $t_{sys}$ of the execution time in the kernel status and the accumulated value tio of the execution time in the I/O wait status in the virtual machine 10. Moreover, the physical CPU usage statistics calculating unit 4 calculates the accumulated value $T_{sys}$ of the execution time in the kernel status and the accumulated value $T_{io}$ of the execution time in the I/O wait status in the physical CPU included in the virtual system 11. Then, the timer modulation unit 6 intercepts the setting of the timer interrupt by the guest OS 10B, then changes the timer interval according to the formulae 1 and 2, and sets the timer interrupt in the actual physical CPU. Furthermore, the timer modulation unit 6 sets the guest timer activating handler in FIG. 16 as the timer handler.

Accordingly, when in the kernel status and the I/O wait status, the timer interval is changed based on the formula 1 or 2, and the virtual timer interrupt occurs in the guest OS 10B at the thus-changed timer interval. Namely, as shown in the fields C2 and C3 in FIG. 5, the timer interrupt occurrence count in the kernel status and the I/O wait status is retained as the total count in the single I/O process of the guest OS 10B. Then, the ratio of the timer interrupt occurrence count in the kernel status to the timer interrupt occurrence count in the I/O wait status with respect to the virtual CPU in the guest OS 10B, is adjusted in the status of retaining the timer interrupt occurrence count as the total count. Namely, the timer interval is changed so that the ratio of the timer interrupt occurrence count in the kernel status to the timer interrupt occurrence count in the I/O wait status with respect to the virtual CPU in the guest OS 10B coincides with the ratio of the timer interrupt occurrence count in the kernel status to the timer interrupt occurrence count in the I/O wait status with respect to the process with the physical CPU.

Therefore, in the virtual OS, the statistical information on the kernel execution time and the I/O wait execution time when executing the I/O process get approximate to the statistical information under the condition similar to the case of being measured by the actual physical computer. Namely, as illustrated in FIG. 5, when the guest OS 10B inputs and outputs the data to the I/O device via the virtual machine monitor 1, the ratio of the I/O wait time recognized by the guest OS 10B to the processing time other than the I/O wait time becomes approximate to the ratio of the I/O wait time recognized by the virtual machine monitor 1 to the processing time other than the I/O wait time.

By the way, the first working example has discussed so far the case of using one virtual CPU. The first working example can be also applied as it is to the case of using the plurality of virtual CPUs. The reason why so is that there is no necessity for modulating the user time and the idle time while only the sys time and iowait time are modulated. The user time does not originally need modulating, while the idle time is another item of value which has no concern therewith in the virtual CPU usage statistics, and it is therefore sufficient to modulate only the sys time and iowait time. As exemplified in the first working example, the case in which the virtual machine monitor 1 calculates the physical CPU usage statistical information with respect to the whole physical system, involves using such a primary approximate method of performing the modulation so as to equalize the ratio of the sys time to the iowait time in the virtual CPU usage statistical information of all of the virtual machines.

Further, the accumulated values $t_{io}$ and $t_{sys}$ exemplified in the first working example are the estimated values of the iowait time and the sys time observed actually by the guest OS 10B in a way that uses as a key the wait-for-completion I/O count that is newly provided by the virtual machine monitor 1, and the estimation thereof is also done otherwise.

The following are plural other methods of increasing accuracy of the approximation to the iowait time and the sys time and estimating the iowait time and the sys time of the guest OS 10B.

FIRST MODIFIED EXAMPLE

The physical CPU usage statistical information may be calculated per virtual CPU by way of a policy of carrying out the timer modulation with the high accuracy. Namely, the virtual machine monitor 1 manages the individual virtual CPUs in a way that identifies each virtual CPU, and hence an available scheme is that the virtual machine monitor 1 hands over the information for identifying the target virtual CPU which calculates the usage statistical information to the physical CPU usage statistics calculating unit 4 by which the physical CPU usage statistical information is calculated for each individual virtual CPU. For attaining this scheme, $T_{sys}$ and $T_{io}$ are prepared corresponding to the (number of) different entries distinguished by the information for identifying the individual virtual CPUs and are thus accumulated. Then, the timer modulation unit 6 illustrated in FIG. 14 refers to $T_{sys}$ and $T_{io}$ defined as the statistical information of the virtual CPU concerned on the basis of the information for identifying the modulation target virtual CPU, and calculates $\mu_{sys}$ and $\mu$ according to the formulae 1 and 2.

The method of calculating the physical CPU usage statistical information on a per-virtual CPU basis is suited to a case of giving a different type of load per physical CPU. For example, the case is exemplified such that a certain guest OS frequently accesses the disc, while other guest OSs frequently access the network, and on these occasions each guest OS uses the predetermined physical CPU.

Further, the virtual machine monitor 1 manages the individual physical devices in a way that identifies each physical device, and hence the available scheme is that the virtual machine monitor 1 hands over the information for identifying the target physical device which calculates the usage statistical information to the physical CPU usage statistics calculating unit 4 by which the physical CPU usage statistical information is calculated for each individual physical device. For attaining this scheme, $T_{sys}$ and $T_{io}$ are prepared corresponding to the number of different entries distinguished by the information for identifying the individual physical devices and are thus accumulated. Then, the timer modulation unit 6 illustrated in FIG. 14 refers to $T_{sys}$ and $T_{io}$ defined as the statistical information concerned on the basis of the information for identifying the now-in-execution I/O process target physical device, and calculates $\mu_{sys}$ and $\mu_{io}$ according to the formulae 1 and 2.

The process of calculating $T_{sys}$ and $T_{io}$ per individual physical device is suited to the case of handling the plurality of physical devices having different characteristics. The physical device is exemplified such as a USB (Universal Serial Bus) device, a SAN (Storage Area Network) disk and an IDE (Integrated Drive Electronics) disk.

SECOND MODIFIED EXAMPLE

Figure 17:
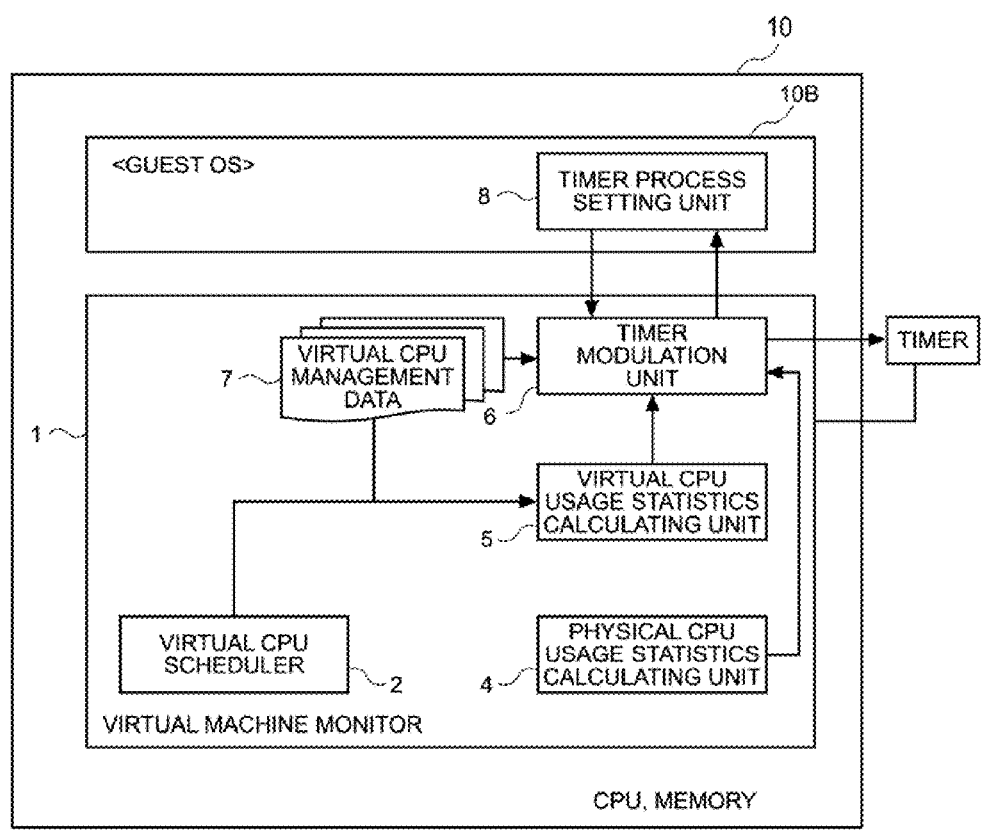
FIG. 17 is a diagram illustrating a configuration of the virtual machine including none of the virtual CPU status determining unit.

FIG. 17 illustrates a configuration of the virtual machine including none of the virtual CPU status determining unit 3. Note that the same components in FIG. 17 as those in FIG. 6 are marked with the same numerals and symbols, and their explanations are omitted.

In the configuration of FIG. 17, the guest OS 10B makes an explicit entry in the virtual CPU management data 7 about which item, user or sys or idle or iowait, the virtual CPU usage statistics calculating unit 5 should calculate the data. To be specific, the guest OS 10B, before executing the process of prompting the issue of the privilege instruction such as the system call, explicitly shows that the process is in the user status to the status flag on the shared memory. Moreover, the guest OS 10B, till the privilege instruction is completed after executing the process of prompting the issue of the privilege instruction such as the system call, explicitly shows that the process is in the kernel status to the status flag on the shared memory. Furthermore, the guest OS 10B, till the I/O process is completed after executing the I/O request, explicitly shows that the process is in the I/O wait status to the status flag on the shared memory. On the other hand, the virtual CPU usage statistics calculating unit 5, if the information of being the I/O wait time is not explicitly indicated in the flag of the shared memory, accumulates the elapse time in the idle time. In order for the guest OS 10B to explicitly show user, sys, iowait described above, though the guest OS 10B needs modifying slightly, there is no necessity for making a change in the timer process itself. In this case, the virtual CPU status determining unit 3 can be omitted. Further, the guest OS 10B indicates user, sys, iowait recognized by the guest OS 10B itself to the virtual CPU usage statistics calculating unit 5, and it is therefore feasible to totalize and accumulate the user time, the sys time and iowait time with the high accuracy.

Note that for simplicity, the guest OS 10B may totalize and accumulate the user time, the sys time and iowait time. Then, the virtual machine monitor 1 may read the user time, the sys time and iowait time that are totalized and accumulated by the guest OS 10B. The virtual CPU usage statistics calculating unit 5 receives, from the guest OS 10B, the user time, the sys time and iowait time recognized by the guest OS 10B, thereby enabling the statistical information to be acquired more precisely. Accordingly, $t_{sys}$ and $t_{io}$ given in the formulae 1 and 2 can be exactly acquired.

Moreover, the modulation ratio $t_{io}/T_{io}$ of the I/O time and the modulation ratio $t_{sys}/T_{sys}$ of the kernel time may involve using values which are obtained empirically and experimentally beforehand. Specifically, the same operation system is operated on each of the guest OS 10B on the virtual system 11 and the physical OS on the physical system 300, at which time the I/O time and the kernel time are measured as $t_{io}$, $t_{sys}$ and $T_{io}$, $T_{sys}$, respectively. The calculations in the formulae 1 and 2 are made by use of the I/O time modulation ratio and the kernel time modulation ratio, which are calculated by employing these values.

<<Computer-Readable Medium>>

The program for adding one of the above-mentioned functions to the computer, another machine or device (hereinafter, the computer etc.) can be recorded into the computer and the like readable medium. And, it is possible to perform the function thereof by making the computer and the like read the program from the computer etc-readable medium and execute the program.

Herein, the computer etc-readable medium connotes a recording medium capable of accumulating information such as the program and the data by electrical, magnetic, optical, chemical, physical, or mechanical action, and retaining the information in a readable-by-computer status. Moreover, in the computer etc-readable mediums, the attachable/detachable computer etc-readable medium can be exemplified by a flexible disk, a magneto optical disk, a CD-ROM, a CR-R/W, a DVD, a blu-ray disc, a DAT, an 8 mm tape, a memory card such as a flash memory. Furthermore, the computer etc-readable mediums fixedly installed in the computer etc. can be exemplified by a hard disk, a ROM (Read Only Memory).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A virtual machine, comprising:
   a computer including a memory, a processor, a timer and an input/output (I/O) device; and
   a virtual machine monitor to be loaded on the memory and executed by the processor, the virtual machine monitor controlling execution of at least one guest operating system (OS) on the processor, accepting a process request from the guest OS to the computer and handing over a result of execution made by the computer in response to the process request to the guest OS,
   wherein the virtual machine monitor makes the processor function as:
   a unit to receive a timer setting from the guest OS, the timer setting being for making the timer generate a timer interrupt after a lapse of a setting period;
   a timer changing unit to change the setting period set in the timer setting so that a ratio of first I/O wait time to first I/O process time other than the first I/O wait time becomes approximate to a ratio of second I/O wait time to second I/O process time, the first I/O wait time being time recognized by the guest OS as I/O wait time, time first I/O process time being time recognized by the guest OS as I/O process time, the second I/O wait time being time recognized by the virtual machine monitor as I/O wait time, and the second I/O process time being time recognized by the virtual machine monitor as I/O process time;
   a unit to set the timer setting with the changed setting period in the timer; and
   a unit to notify, when receiving the timer interrupt, the guest OS of occurrence of the timer interrupt.

2. The virtual machine according to claim 1, wherein the timer changing unit changes, in a period of a privilege status recognized by the guest OS when data is transferred between the I/O device and the guest OS via the virtual machine monitor, the setting period in the timer setting according to a ratio of a reference value of the first I/O process time in the privilege status recognized by the guest OS and a reference value of the second I/O process time in the privilege status recognized by the virtual machine monitor.

3. The virtual machine according to claim 1, wherein the timer changing unit changes, in a period of the I/O wait recognized by the guest OS when data is transferred between the I/O device and the guest OS via the virtual machine monitor, the setting period in the timer setting according to a ratio of a reference value of the first I/O wait time and a reference value of the second I/O wait time.

4. A non-transitory storage medium stored with a virtual machine monitor executed by a processor of a computer including a memory, the processor, a timer and an input/output (I/O) device, the virtual machine monitor controlling execution of at least one guest operating system (OS) on the processor, accepting a process request from the guest OS to the computer and handing over a result of execution made by the computer in response to the process request to the guest OS,
   wherein the virtual machine monitor makes the processor function as:
   a unit to receive a timer setting from the guest OS, the timer setting being for making the timer generate a timer interrupt after a lapse of a setting period;
   a timer changing unit to change the setting period set in the timer setting so that a ratio of first I/O wait time to first I/O process time other than the first I/O wait time becomes approximate to a ratio of second I/O wait time to second I/O process time, the first I/O wait time being time recognized by the guest OS as I/O wait time, the first I/O process time being time recognized by the guest OS as I/O process time, the second I/O wait time being time recognized by the virtual machine monitor as I/O wait time, and the second I/O process time being time recognized by the virtual machine monitor as I/O process time;
   a unit to set the timer setting with the changed setting period in the timer; and
   a unit to notify, when receiving the timer interrupt from the timer, the guest OS of occurrence of the timer interrupt.

5. The non-transitory storage medium according to claim 4, wherein the timer changing unit changes, in a period of the privilege status recognized by the guest OS when data is transferred between the I/O device and the guest OS via the virtual machine monitor, the setting period in the timer setting according to a ratio of a reference value of the first I/O process time in the privilege status recognized by the guest OS and a reference value of the second I/O process time in the privilege status recognized by the virtual machine monitor.

6. The non-transitory storage medium according to claim 4, wherein the timer changing unit changes, in a period of the I/O wait recognized by the guest OS when data is transferred between the I/O device and the guest OS via the virtual machine monitor, the setting period in the timer setting according to a ratio of a reference value of the first I/O wait time and a reference value of the second I/O wait time.

7. A computer control method executed by a computer comprising a memory, a timer, an input/output (I/O) device and a processor on which to operate one guest OS and a virtual machine monitor controlling execution of the guest OS, the method comprising:
　　making the virtual machine monitor receive a timer setting from the guest OS, the timer setting being for making the timer generate a timer interrupt after a lapse of a setting period;
　　making the virtual machine monitor change the setting period set in the timer setting so that a ratio of first I/O wait time to first I/O process time other than the first I/O wait time becomes approximate to a ratio of second I/O wait time to second I/O process time, the first I/O wait time being time recognized by the guest OS as I/O wait time, the first I/O process time being time recognized by the guest OS as I/O process time, the second I/O wait time being time recognized by the virtual machine monitor as I/O wait time, and the second I/O process time being time recognized by the virtual machine monitor as I/O process time;
　　setting the timer setting with the changed setting period in the timer from the virtual machine monitor; and
　　making the virtual machine monitor notify, when receiving the timer interrupt from the timer, the guest OS of occurrence of the timer interrupt.

8. The computer control method according to claim 7, wherein, in a period of a privilege status recognized by the guest OS when data is transferred between the I/O device and the guest OS via the virtual machine monitor, changing of the setting period in the timer setting is performed according to a ratio of a reference value of the first I/O process time in the privilege status recognized by the guest OS and a reference value of the second I/O process time in the privilege status recognized by the virtual machine monitor.

9. The computer control method according to claim 7, wherein, in a period of an I/O wait recognized by the guest OS when data is transferred between the I/O device and the guest OS via the virtual machine monitor, changing of the setting period in the timer setting is performed according to a ratio of a reference value of the first I/O wait time and a reference value of the second I/O wait time.

* * * * *